(12) United States Patent
Kurita et al.

(10) Patent No.: US 8,765,313 B2
(45) Date of Patent: Jul. 1, 2014

(54) FUEL CELL SYSTEM AND METHOD OF CONTROLLING SAME

(75) Inventors: Kenji Kurita, Nagoya (JP); Kazumasa Takada, Nishikamo-gun (JP); Shiro Yamasaki, Toyoake (JP); Norihiko Toyonaga, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1383 days.

(21) Appl. No.: 11/902,270

(22) Filed: Sep. 20, 2007

(65) Prior Publication Data

US 2008/0081231 A1  Apr. 3, 2008

(30) Foreign Application Priority Data

Sep. 28, 2006  (JP) .................................. 2006-264419

(51) Int. Cl.
*H01M 8/06* (2006.01)
*H01M 8/04* (2006.01)

(52) U.S. Cl.
USPC ............ 429/423; 429/427; 429/429; 429/433

(58) Field of Classification Search
USPC .................................. 429/423, 427, 429, 433
See application file for complete search history.

(56) References Cited

U.S. PATENT DOCUMENTS

| | | | |
|---|---|---|---|
| 6,159,626 A * | 12/2000 | Keskula et al. ................ | 429/429 |
| 2002/0127447 A1 * | 9/2002 | Edlund et al. .................... | 429/19 |
| 2003/0068540 A1 | 4/2003 | Ueda et al. | |
| 2004/0081867 A1 * | 4/2004 | Edlund ............................ | 429/22 |
| 2004/0101724 A1 * | 5/2004 | Imamura et al. ................ | 429/22 |
| 2006/0153687 A1 * | 7/2006 | Ishikawa et al. ............. | 417/44.1 |
| 2006/0210849 A1 * | 9/2006 | Bono .............................. | 429/22 |
| 2007/0099040 A1 * | 5/2007 | Morita et al. ................... | 429/22 |
| 2007/0122666 A1 * | 5/2007 | Su et al. .......................... | 429/17 |
| 2007/0224471 A1 | 9/2007 | Tanaka et al. | |
| 2009/0226779 A1 * | 9/2009 | Ohkawara ....................... | 429/19 |

FOREIGN PATENT DOCUMENTS

| | | | |
|---|---|---|---|
| JP | 58-164167 A | | 9/1983 |
| JP | 02-018870 A | | 1/1990 |
| JP | 07-226224 A | | 8/1995 |
| JP | 08-069808 A | | 3/1996 |
| JP | 11144749 A | | 5/1999 |
| JP | 2002-063927 | | 2/2002 |
| JP | 2002-175827 A | | 6/2002 |
| JP | 2002-198075 A | | 7/2002 |
| JP | 2002-352839 A | | 12/2002 |
| JP | 2003-243005 A | | 8/2003 |

(Continued)

OTHER PUBLICATIONS

Information Offer Form received Aug. 22, 2011 in JP 2006-264419 & English translation thereof.

(Continued)

*Primary Examiner* — Eugenia Wang
(74) *Attorney, Agent, or Firm* — Kenyon & Kenyon LLP

(57) ABSTRACT

A fuel cell system includes a reformer that generates reformed gas using reforming fuel; a fuel cell that generates electric power using the reformed gas generated by the reformer; and a control device. The control device includes a plurality of different stop control modes for stopping operation of the fuel cell system, and selects a specific stop control mode among the plurality of stop control modes, according to the cause of a malfunction of the fuel cell system.

11 Claims, 10 Drawing Sheets

(56) References Cited

FOREIGN PATENT DOCUMENTS

| | | |
|---|---|---|
| JP | 2004-095425 A | 3/2004 |
| JP | 2004-103395 A | 4/2004 |
| JP | 3661826 A | 6/2005 |
| JP | 2005-251603 A | 9/2005 |
| JP | 2005-337439 A | 12/2005 |
| JP | 2006-031995 A | 2/2006 |
| JP | 2006-048681 A | 2/2006 |
| JP | 2006-073376 A | 3/2006 |
| JP | 2006-079928 A | 3/2006 |
| JP | 2006079981 A | 3/2006 |
| JP | 2006-147264 A | 6/2006 |
| JP | 2006-156180 A | 6/2006 |
| JP | 2007-141787 A | 6/2007 |
| WO | 2005/004269 A2 | 1/2005 |
| WO | WO 2005020360 A1 * | 3/2005 |
| WO | WO 2005057705 A1 * | 6/2005 |
| WO | 2006013949 A1 | 2/2006 |
| WO | WO 2006057223 A1 * | 6/2006 |
| WO | 2006/088077 A1 | 8/2006 |

OTHER PUBLICATIONS

Office Action issued Jun. 14, 2012 in JP 2006-264419 & English translation thereof.

* cited by examiner

FUEL CELL SYSTEM AND METHOD OF CONTROLLING SAME

INCORPORATION BY REFERENCE

The disclosure of Japanese Patent Application No. 2006-264419 filed on Sep. 28, 2006 including the specification, drawings and abstract is incorporated herein by reference in its entirety.

BACKGROUND OF THE INVENTION

1. Field of the Invention

The invention relates to a fuel cell system and a method of controlling the same.

2. Description of the Related Art

Japanese Patent Application Publication No. 2004-103395 (JP-A-2004-103395) describes a fail-stop control apparatus relating to a fuel cell system. The fail-stop control apparatus determines whether there is a possibility that water inside the fuel cell system may be frozen when the fuel cell system is stopped because of a malfunction. When there is a possibility that the water inside the fuel cell system may be frozen, the fail-stop control apparatus discharges the water from the fuel cell system to the outside. Japanese Patent Application Publication No. 2002-63927 (JP-A-2002-63927) describes a fuel cell system in which electric power is supplied from a secondary battery provided in the fuel cell system to prevent a problem relating to the operation of a fuel cell, when electric outage occurs during the operation of the fuel cell. Japanese Patent Application Publication No. 2005-251603 (JP-A-2005-251603) describes a method of stopping a fuel gas production apparatus, in which when a starting switch is turned on, a system check is performed; and if it is determined that a malfunction occurs during the system check, a process of stopping the fuel gas production apparatus is executed. Japanese Patent Application Publication No. 2002-352839 (JP-A-2002-352839) describes a stop control apparatus for protecting a fuel cell system, which controls stop of the fuel cell system to protect the fuel cell system when it is determined that a malfunction occurs in a fuel cell body and/or an auxiliary machine.

SUMMARY OF THE INVENTION

The invention relates to a fuel cell system that is controlled according to the cause of a malfunction, and a method of controlling the same.

According to a first aspect of the invention, a fuel cell system includes a reformer that generates reformed gas using reforming fuel; a fuel cell that generates electric power using the reformed gas generated by the reformer; and a control device that includes a plurality of different stop control modes for stopping operation of the fuel cell system, and that selects a specific stop control mode among the plurality of stop control modes according to the cause of a malfunction of the fuel cell system.

According to a second aspect of the invention, the fuel cell system according to the first aspect further includes a supply valve, provided between the reformer and the fuel cell, which is opened and closed to permit and prohibit supply of the reformed gas generated by the reformer to the fuel cell. In the fuel cell system, when urgency of stopping the fuel cell system is relatively low, the control device executes a stop control mode where the supply valve is opened to permit the supply of the reformed gas generated by the reformer to the fuel cell so that the reformed gas is contained in the fuel cell. When the urgency of stopping the fuel cell system is relatively high, the control device executes a stop control mode where the supply valve is closed to prohibit the supply of the reformed gas generated by the reformer to the fuel cell.

According to a third aspect of the invention, in the fuel cell system according to the first aspect, the reformer includes a reforming portion that generates the reformed gas using the reforming fuel, and a combustion portion to which combustion air and combustion fuel are supplied, and which heats the reforming portion by combustion of the combustion fuel. In the fuel cell system, when urgency of stopping the fuel cell system is relatively low, the control device executes a stop control mode where supply of the combustion fuel to the combustion portion is prohibited, and the combustion air is supplied to the combustion portion to cool the reformer. When the urgency of stopping the fuel cell system is relatively high, the control device executes a stop control mode where the supply of the combustion fuel to the combustion portion is stopped, and supply of the combustion air to the combustion portion is prohibited.

According to a fourth aspect of the invention, the fuel cell system according to the first aspect further includes a condenser that condenses moisture contained in the reformed gas supplied from the reformer to the fuel cell; a condensing-system delivery source that moves a cooling medium to cool the condenser; a cooling medium passage through which the cooling medium is circulated to cool the fuel cell; a hot-water storage passage connected to a hot-water storage tank; a heat exchange portion in which heat is exchanged between the cooling medium in the cooling medium passage and water in the hot-water storage passage; and a hot-water storage system delivery source that moves the water in the hot-water storage passage. In the fuel cell system, when urgency of stopping the fuel cell system is relatively low, the control device executes a stop control mode where cooling operation of driving the condensing-system delivery source and the hot-water storage system delivery source is performed. When the urgency of stopping the fuel cell system is relatively high, the control device executes a stop control mode where the condensing-system delivery source and the hot-water storage system delivery source are prohibited from being driven.

According to a fifth aspect of the invention, in the fuel cell system according to the first aspect, the reformer includes a reforming portion that generates the reformed gas using the reforming fuel, and a combustion portion to which combustion air and combustion fuel are supplied, and which heats the reforming portion by combustion of the combustion fuel. The fuel cell system further includes a bypass valve, provided between the reforming portion and the combustion portion, which is opened and closed to permit and prohibit supply of the reformed gas generated by the reforming portion to the combustion portion. In the fuel cell system, when urgency of stopping the fuel cell system is relatively low, the control device executes a stop control mode where the bypass valve is opened to permit the supply of the reformed gas generated by the reforming portion to the combustion portion so that the reformed gas is contained in the combustion portion. When the urgency of stopping the fuel cell system is relatively high, the control device executes a stop control mode where the bypass valve is closed to prohibit the supply of the reformed gas generated by the reforming portion to the combustion portion.

According to a sixth aspect of the invention, the fuel cell system according to the first aspect further includes a purge valve, provided between a source of the reforming fuel and the fuel cell, which is opened and closed to permit and prohibit supply of the reforming fuel to the fuel cell. In the fuel cell system, when urgency of stopping the fuel cell system is relatively low, the control device executes a stop control mode where the purge valve is opened to permit the supply of the reforming fuel to the fuel cell so that the reforming fuel is contained in the fuel cell. When the urgency of stopping the fuel cell system is relatively high, the control device executes a stop control mode where the purge valve is closed to prohibit the supply of the reforming fuel to the fuel cell.

According to a seventh aspect of the invention, the fuel cell system according to the first aspect further includes a memory that stores the operating state of the fuel cell system; and a restart control device that controls restart of the fuel cell system based on the operating state of the fuel cell system stored in the memory, when the fuel cell system is restarted.

According to an eighth aspect of the invention, in the fuel cell system according to the seventh aspect, the restart control device includes a restart prohibition device that executes a diagnostic mode when a restart switch is operated to restart the fuel cell system after the operation of the fuel cell system is brought to an emergency stop. When it is determined that a constituent component of the fuel cell system is in a normal state based on the result of a determination made in the diagnostic mode, the restart prohibition device permits restart of the fuel cell system. When it is determined that the constituent component is not in the normal state based on the result of the determination made in the diagnostic mode, the restart prohibition device prohibits the restart of the fuel cell system.

According to a ninth aspect of the invention, in the fuel cell system according to the first aspect, the control device executes a control of prohibiting supply of the reformed gas generated by the reformer to the fuel cell by interrupting communication between the reformer and an anode of the fuel cell, a control of prohibiting the supply of the reformed gas generated by the reformer to the fuel cell by interrupting the communication between the reformer and the anode of the fuel cell, and prohibiting supply of the reforming fuel to the reformer, or a control of prohibiting the supply of the reformed gas generated by the reformer to the fuel cell by interrupting the communication between the reformer and the anode of the fuel cell, prohibiting the supply of the reforming fuel to the reformer, and prohibiting supply of combustion air to the reformer, according to severity or type of the cause of the malfunction of the fuel cell system.

According to a tenth aspect of the invention, the fuel cell system according to the first aspect further includes an anode excessive negative-pressure prevention device that prevents pressure in an anode of the fuel cell from becoming excessively negative by supplying gas that remains in the reformer to the anode of the fuel cell, when pressure inside the reformer becomes high due to stop of the operation of the fuel cell system.

According to an eleventh aspect of the invention, the fuel cell system according to the first aspect further includes a reformer excessive high-pressure prevention device that prevents pressure inside the reformer from becoming excessively high by supplying gas that remains in the reformer to a combustion portion of the reformer, when the pressure inside the reformer becomes high due to stop of the operation of the fuel cell system.

According to a twelfth aspect of the invention, the fuel cell system according to the first aspect further includes an emergency stop operating device that is operated by an operator to bring the operation of the fuel cell system to an emergency stop.

According to a thirteenth aspect of the invention, the fuel cell system according to the first aspect further includes a restriction stop operating device. When the restriction stop operating device is operated by an operator to start the fuel cell system for the first time after the operation of the fuel cell system is brought to an emergency stop because of a malfunction, restriction of part of, or all of a function of the fuel cell system is stopped. When the restriction stop operating device is not operated, part of, or all of the function of the fuel cell system is restricted.

According to a fourteenth aspect of the invention, a method of controlling a fuel cell system that includes a reformer that generates reformed gas using reforming fuel; and a fuel cell that generates electric power using the reformed gas generated by the reformer includes the step of selecting a specific stop control mode among a plurality of stop control modes for stopping operation of the fuel cell system, according to the cause of a malfunction of the fuel cell system.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
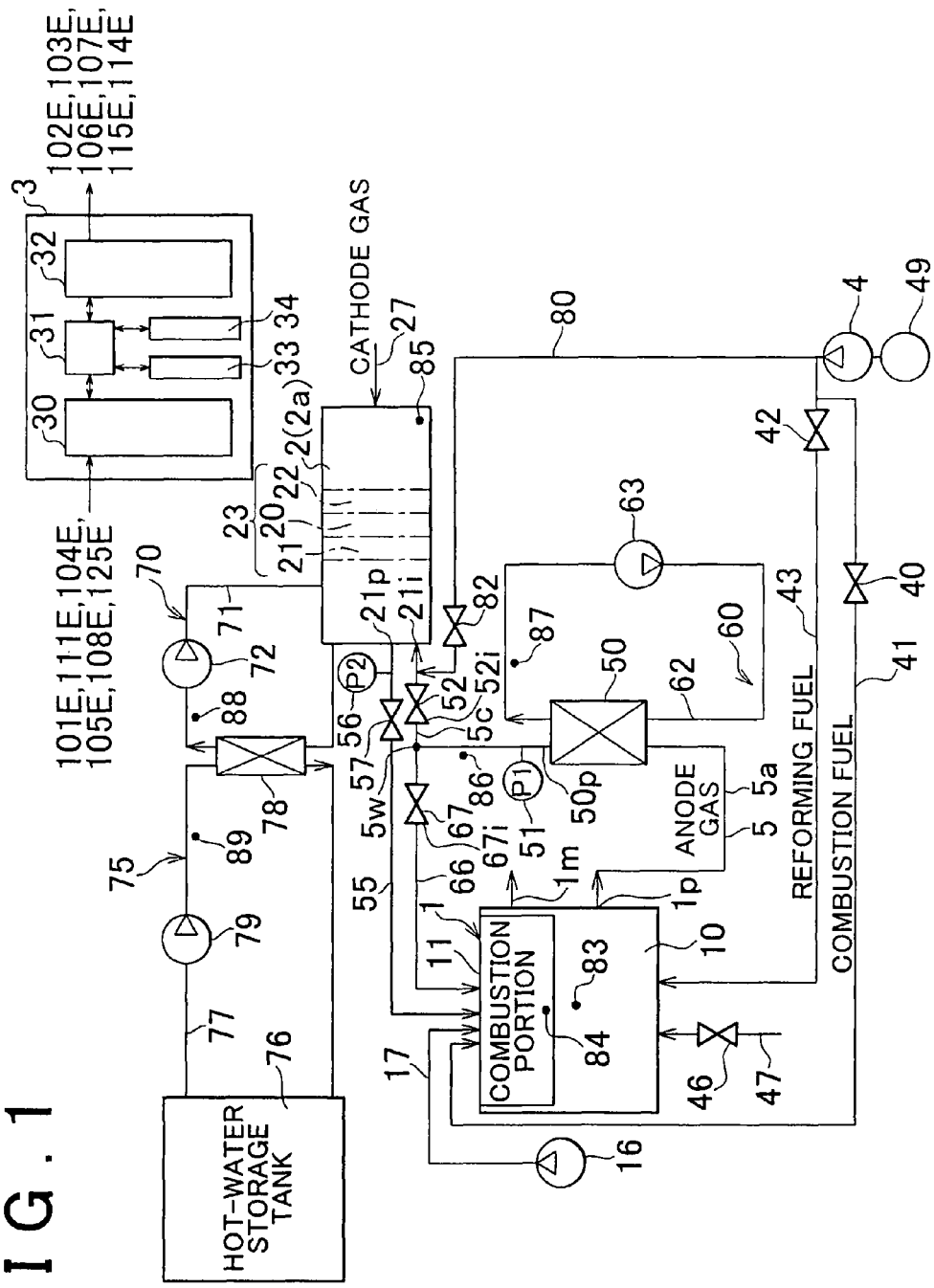
FIG. 1 is a block diagram showing a fuel cell system according to a first embodiment.

Hereinafter, a first embodiment of the invention will be described with reference to FIG. 1 to FIG. 5. A fuel cell system according to the embodiment includes a reformer 1, and a stack 2 of a fuel cell 2a, and a control device 3. The reformer 1 generates reformed gas as anode gas, using reforming fuel (for example, hydrocarbon-based gas). The stack 2 of the fuel cell 2a generates electric power using the reformed gas generated by the reformer 1. The control device 3 controls the fuel cell system.

The stack 2 of the fuel cell 2a includes a plurality of membrane-electrode assemblies 23. Each of the membrane-electrode assemblies 23 is formed by sandwiching a polymer ion-conducting membrane 20 (a proton-conducting membrane) between an anode 21 (a fuel electrode) and a cathode 22 (an oxidant electrode). A plurality of membrane-electrode assemblies 23 in the form of sheets may be stacked in the stack 2. Alternatively, a plurality of membrane-electrode assemblies 23 in the form of tubes may be provided in the stack 2.

The reformer 1 includes a reforming portion 10, and a combustion portion 11. The combustion portion 11 functions as a heating portion that heats the reforming portion 10. In the reforming portion 10, steam generated using reforming water in an evaporation portion (not shown) reacts with the reforming fuel. As a result, reformed gas, which contains hydrogen gas as a main component, is generated using the reforming fuel. The reforming portion 10 includes a catalyst that promotes a reforming reaction. Air for combustion (hereinafter, referred to as "combustion air") and fuel for combustion (hereinafter, referred to as "combustion fuel") are supplied to the combustion portion 11, and the combustion fuel is burned in the combustion portion 11. When a combustion-air blower 16 (a combustion-air delivery source) is operated, the combustion air is supplied to the combustion portion 11 of the reformer 1 through a combustion-air passage 17. When a fuel pump 4 (a fuel delivery source) is operated, and a combustion-fuel valve 40 is opened, fuel from a fuel source 49 is supplied, as the combustion fuel, to the combustion portion 11 of the reformer 1 through a combustion-fuel passage 41. Thus, the combustion fuel is burned in the combustion portion 11. Combustion exhaust gas generated in the combustion portion 11 is discharged to the outside through a combustion-exhaust-gas passage 1*m*. The reforming portion 10 is heated to a high temperature appropriate for the reforming reaction (for example, 400° C. or higher). When the fuel pump 4 is operated, and a reforming-fuel valve 42 is opened, the fuel from the fuel source 49 (for example, hydrocarbon-based fuel gas) is supplied, as the reforming fuel, to the reforming portion 10 of the reformer 1 through a reforming-fuel passage 43. When a reforming-water valve 46 is opened, reforming water is supplied to the evaporation portion (not shown) of the reformer 1 through a reforming-water passage 47. Thus, water in a gaseous state is generated. The reforming fuel is steam-reformed using the water in the gaseous state. Thus, the reformed gas, which contains hydrogen as the main component, is generated in the reformer 1. Although both of the combustion-fuel valve 40 and the reforming-fuel valve 42 are connected to the fuel pump 4, the combustion-fuel valve 40 and the reforming-fuel valve 42 may be connected to respective separate pumps. The reformer 1 includes a CO removal portion (not show) that reduces the amount of carbon monoxide contained in the reformed gas.

As shown in FIG. 1, an anode-gas passage 5 is provided to connect the reactant gas outlet 1*p* of the reformer 1 to the inlet 21*i* of the anode 21 of the stack 2 of the fuel cell 2*a*. The anode-gas passage 5 is provided with a condenser 50, a reformer-pressure sensor 51, and a supply valve 52. The condenser 50 cools the reformed gas. The reformer-pressure sensor 51 detects a pressure P1 inside the reformer 1. The supply valve 52 is positioned upstream of the anode 21 of the stack 2 of the fuel cell 2*a*. The supply valve 52 is formed by an electromagnetic valve, and is opened and closed. The anode-gas passage 5 includes a passage portion 5*a* that connects the outlet 1*p* of the reformer 1 to the condenser 50, and a passage portion 5*c* that connects the condenser 50 to the inlet 21*i* of the stack 2 via a confluence portion 5*w*.

As shown in FIG. 1, an off-gas passage 55 is provided to connect the outlet 21*p* of the anode 21 of the stack 2 of the fuel cell 2*a*, to the combustion portion 11 of the reformer 1. During normal operation of the stack 2, anode off-gas (i.e., the gas that may contain unreacted hydrogen) is discharged through the outlet 21*p* of the anode 21 of the stack 2 of the fuel cell 21 after a power generation reaction, and then, the anode off-gas is supplied to the combustion portion 11 of the reformer 1 through the off-gas passage 55. Thus, the anode off-gas is burned in the combustion portion 11. The off-gas passage 55 is provided with a stack pressure sensor 56, and an exhaust valve 57. The stack pressure sensor 56 detects a pressure P2 inside the anode 21-side of the fuel cell 2*a*. The exhaust valve 57 is positioned downstream of the outlet 21*p* of the anode 21 of the stack 2.

As shown in FIG. 1, a condensing system 60, which cools the reformed gas, is provided. The condensing system 60 cools the reformed gas supplied to the inlet 21*i* of the anode 21 of the fuel cell 2*a* from the outlet 1*p* of the reformer 1, thereby condensing and removing moisture contained in the reformed gas. The condensing system 60 includes a coolant passage 62 (a cooling medium passage) and a condensing-system pump 63 (a condensing-system delivery source). In the coolant passage 62, coolant that is a cooling medium (a cooling medium in a liquid state) is circulated via the condenser 50 that functions as a heat exchanger. The condensing-system pump 63 moves, i.e., circulates the coolant in the coolant passage 62. When the condensing-system pump 63 is driven, the coolant is circulated in the coolant passage 62. Therefore, the high-temperature reformed gas is cooled by heat transfer in the condenser 50. Accordingly, the moisture contained in the reformed gas that flows through the anode-gas passage 5 is condensed and removed.

A bypass passage 66 is provided to connect the confluence portion 5*w* of the anode-gas passage 5 to the combustion portion 11 of the reformer 1. The bypass passage 66 connects the anode-gas passage 5 to the combustion portion 11. The reformed gas flowing in the anode-gas passage 5 is supplied to the combustion portion 11, and not to the stack 2 through the bypass passage 66. The bypass passage 66 is provided with a bypass valve 67 that is opened and closed. The bypass valve 67 is formed by an electromagnetic valve. When the supply valve 52 is closed, and the bypass valve 67 is opened, the reformed gas discharged from the outlet 50*p* of the condenser 50 is supplied to the combustion portion 11, and not to the stack 2. Thus, the reformed gas is burned in the combustion portion 11.

During power-generation operation of the stack 2, heat is generated in the stack 2. As shown in FIG. 1, a fuel-cell cooling system 70, which cools the stack 2 of the fuel cell 2*a*, is provided. The fuel-cell cooling system 70 includes a fuel-cell cooling passage 71 (a cooling medium passage) and a fuel-cell cooling pump 72 (a cooling medium delivery source). In the fuel-cell cooling system 70, the coolant (the cooling medium) is circulated via the stack 2 of the fuel cell 2*a*. The fuel-cell cooling pump 72 (the cooling medium delivery source) is provided in the fuel-cell cooling passage 71.

As shown in FIG. 1, a hot-water storage system 75, which recovers heat generated in the fuel cell 2*a*, is provided. The hot-water storage system 75 includes a hot-water storage tank 76, a hot-water storage passage 77, a heat exchanger 78, and a hot-water storage system pump 79 (a hot-water storage system delivery source). In the hot-water storage tank 76, heat energy, which is generated in the stack 2 of the fuel cell 2*a*, is stored in the form of hot water. The hot-water storage passage 77 is connected to the hot-water storage tank 76. In the heat exchanger 78, heat is transferred between the coolant (the cooling medium) in the fuel-cell cooling passage 71 and water in the hot-water storage passage 77. The hot-water storage system pump 79 (the hot-water storage system delivery source) moves the water in the hot-water storage passage 77.

A purge passage 80 is provided to connect the fuel pump 4 (fuel supply means) to the inlet 21*i* of the anode 21 of the fuel cell 2*a*. The purge passage 80 is provided with a purge valve 82 that is opened and closed. The purge valve 82 is formed by an electromagnetic valve. When the purge valve 82 is opened, the fuel from the fuel source 49 is supplied to the inlet 21*i* of the anode 21 of the stack 2 of the fuel cell 2*a* through the purge passage 80.

As shown in FIG. 1, temperature sensors 83 to 89 are provided. The temperature sensor 83 detects the temperature inside the reformer 1. The temperature sensor 84 detects the temperature of the combustion portion 11. The temperature sensor 85 detects the temperature of the stack 2 of the fuel cell 2a. The temperature sensor 86 detects the temperature of a portion of the anode-gas passage 5 downstream of the condenser 50. The temperature sensor 87 detects the temperature of the coolant passage 62 of the condensing system 60. The temperature sensor 88 detects the temperature of the fuel-cell cooling passage 71. The temperature sensor 89 detects the temperature of the hot-water storage passage 77.

The control device 3 is provided. The control device 3 (a computer) includes an input process circuit 30, a CPU 31, an output process circuit 32, a first memory 33, and a second memory 34. The second memory 34 is writable memory, and constituted by a nonvolatile memory. Signals from the temperature sensors 83 to 89, and the pressure sensors 51 and 56 are input to the input process circuit 30 of the control device 3. The output process circuit 32 outputs control signals to constituent components, such as the pumps and valves.

According to the embodiment, a start switch 110E, a switch 111E (a normal stop operating device), an emergency stop switch 104E (an emergency stop operating device), a warning device stop switch 105E (a warning stop operating device), a reset switch 108E (a restriction stop operating device, a reset operating device, or a restart switch), and DIP switches 125E (an operation-changing operating device). The start switch 101E starts the fuel cell system. The switch 111E stops the power-generation operation of the fuel cell system. The emergency stop switch 104E brings the operation of the fuel cell system to an emergency stop. The warning device stop switch 105E is used by an operator (for example, a user, or a person in charge of maintenance) to stop a warning device (a buzzer) when the warning device (the buzzer, or warning means) is operated to inform that a malfunction occurs in the fuel cell system (for example, the power-generation operation is stopped, or interrupted). The reset switch 108E is operated by an operator to start the fuel cell system for the first time after the operation of the fuel cell system is brought to an emergency stop because of a malfunction. The DIP switches 125E are used to input instructions for different functions to the fuel cell system. Switch signals from the switches are input to the input process circuit 30.

An operating-state display portion 102E, a display portion 103E, a first display portion 106E, a second display portion 107E, a display portion 115E, a display portion 114E, and the like are provided. The operating-state display portion 102E displays whether the fuel cell system is presently operating. The display portion 103E displays the current value of the output from the fuel cell system. The first display portion 106E displays the current operation code of the fuel cell system. The second display portion 107E displays an error code when the fuel cell system is stopped because of a malfunction. The display portion 115E displays the accumulated number of times that the fuel cell system is started. The display portion 114E indicates that an inspection, such as a routine inspection, needs to be performed when the accumulated time period during which the fuel cell is operating exceeds a predetermined time period, and/or the accumulated number of times that the fuel cell system is started exceeds a predetermined number of times. The output process circuit 32 of the control device 3 outputs control signals to the respective display portions, and the like.

Next, the case where the fuel cell system is started will be described. In this case, the control device 3 drives the fuel pump 4, opens the combustion-fuel valve 40, and drives the combustion-air blower 16 to supply the combustion air to the combustion portion 11 through the combustion-air passage 17. In this case, the control device 3 closes the purge valve 82, the supply valve 52, the exhaust valve 57, and the reforming-fuel valve 42. Because the control device 3 opens the combustion-fuel valve 40, the combustion fuel from the fuel source 49 is supplied to the combustion portion 11, and combustion occurs in the combustion portion 11. Thus, the reforming portion 10 is heated to a high temperature appropriate for the reforming reaction. In this situation, the control device 3 opens the reforming-fuel valve 42. As a result, the reforming fuel is supplied to the reformer 1, along with the steam generated in the evaporation portion (not shown). Accordingly, the reforming fuel is steam-reformed in the reformer 1, and the reformed gas, which contains hydrogen, is generated as the anode gas. At the initial stage of the process of starting the fuel cell, the composition of the reformed gas is not necessarily stable. Therefore, the control device 3 opens the bypass valve 67, while the supply valve 52 and the exhaust valve 57 are closed at the initial stage of the process of starting the fuel cell system. In this case, the reformed gas generated in the reformer 1 passes through the anode-gas passage 5. The amount of moisture contained in the reformed gas is reduced in the condenser 50. Then, the reformed gas is supplied to the combustion portion 11 through the bypass valve 67, and the bypass passage 66. Thus, the reformed gas is used for combustion in the combustion portion 11. The generated combustion exhaust gas is discharged through the combustion-exhaust-gas passage 1m of the reformer 1. When the composition of the reformed gas becomes stable, the control device 3 closes the bypass valve 67, and opens the supply valve 52 and the exhaust valve 57. In this case, the reformed gas generated in the reformer 1 flows, as the anode gas, to the condenser 50 through the anode-gas passage 5. The amount of moisture contained in the reformed gas is reduced in the condenser 50. Then, the reformed gas is supplied to the inlet 21i of the anode 21 of the fuel cell 2a through the confluence portion 5w, and the opened supply valve 52. Air is supplied, as the cathode gas, to the cathode 22 of the stack 2 of the fuel cell 2a through the cathode gas passage 27. Thus, the stack 2 of the fuel cell 2a performs the power-generation operation, thereby generating electric energy. During the operation of the fuel cell system, the control device 3 turns on the condensing-system pump 63, thereby circulating the coolant in the coolant passage 62. Thus, the reformed gas (anode gas) flowing in the anode-gas passage 5 is cooled, and excessive moisture is removed from the reformed gas.

During the operation of the fuel cell system, heat is generated in the stack 2. The control device 3 turns on the fuel-cell cooling pump 72 and the hot-water storage system pump 79. In this case, the coolant is circulated in the fuel-cell cooling passage 71 by the fuel-cell cooling pump 72, and the stack 2 of the fuel cell 2a is cooled. Also, the water is circulated in the hot-water storage passage 77 by the hot-water storage system pump 79, and the heat of the coolant in the fuel-cell cooling passage 71 is transferred to the water in the hot-water storage passage 77 through the heat exchanger 78. As a result, the heat energy generated in the stack 2 is stored in the hot-water storage tank 76 in the form of hot water.

According to the embodiment, the first memory 33 of the control device 3 stores a plurality of different programs relating to modes (stop control modes) for stopping the operations of components that constitute the fuel cell system. If a malfunction occurs in the fuel cell system, the control device 3 selects a specific stop control mode among the plurality of stop control modes, according to the cause of the malfunction of the fuel cell system, and executes the specific stop control mode.

Figure 2:
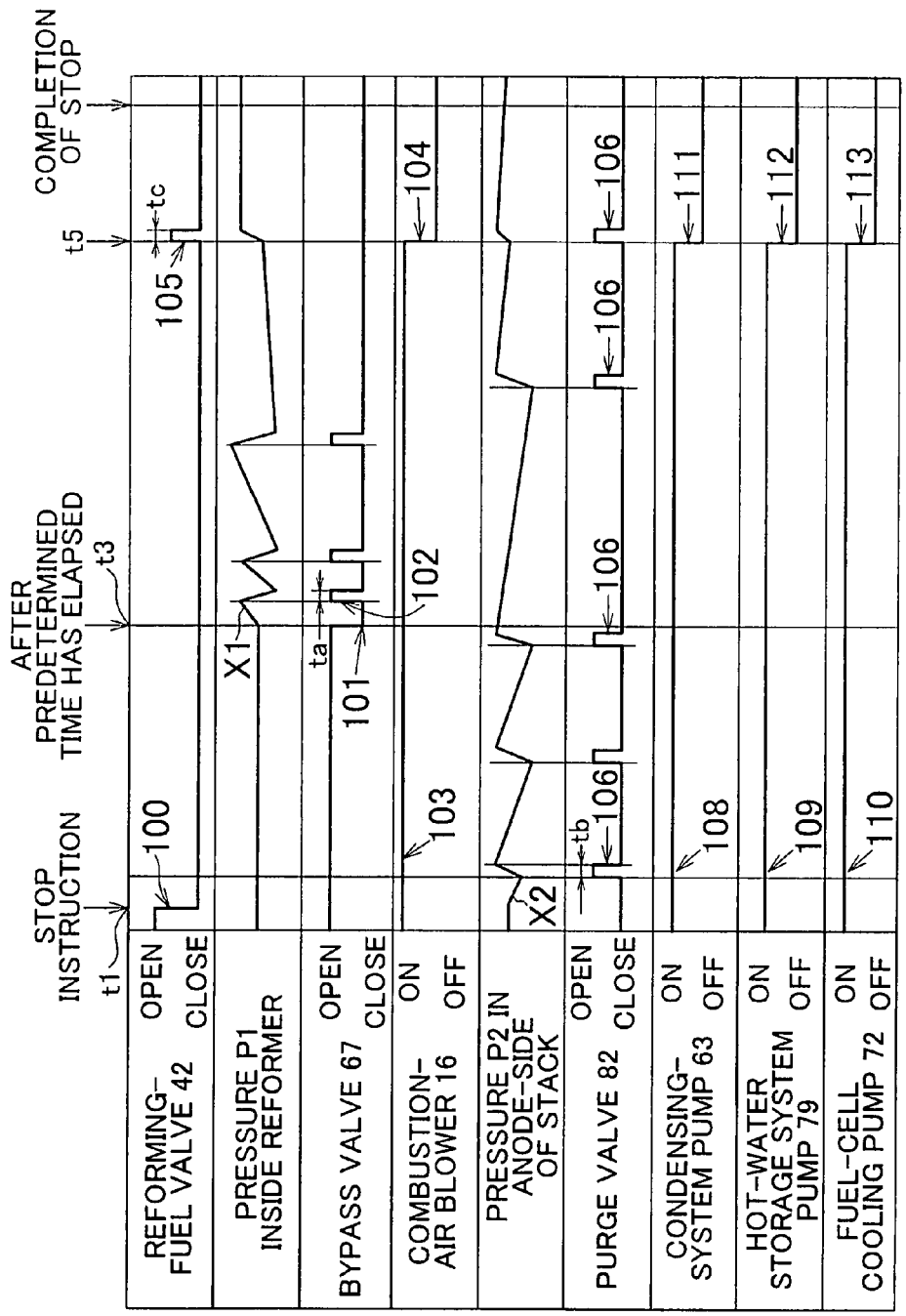
FIG. 2 is a timing chart showing a control A.
Figure 3:
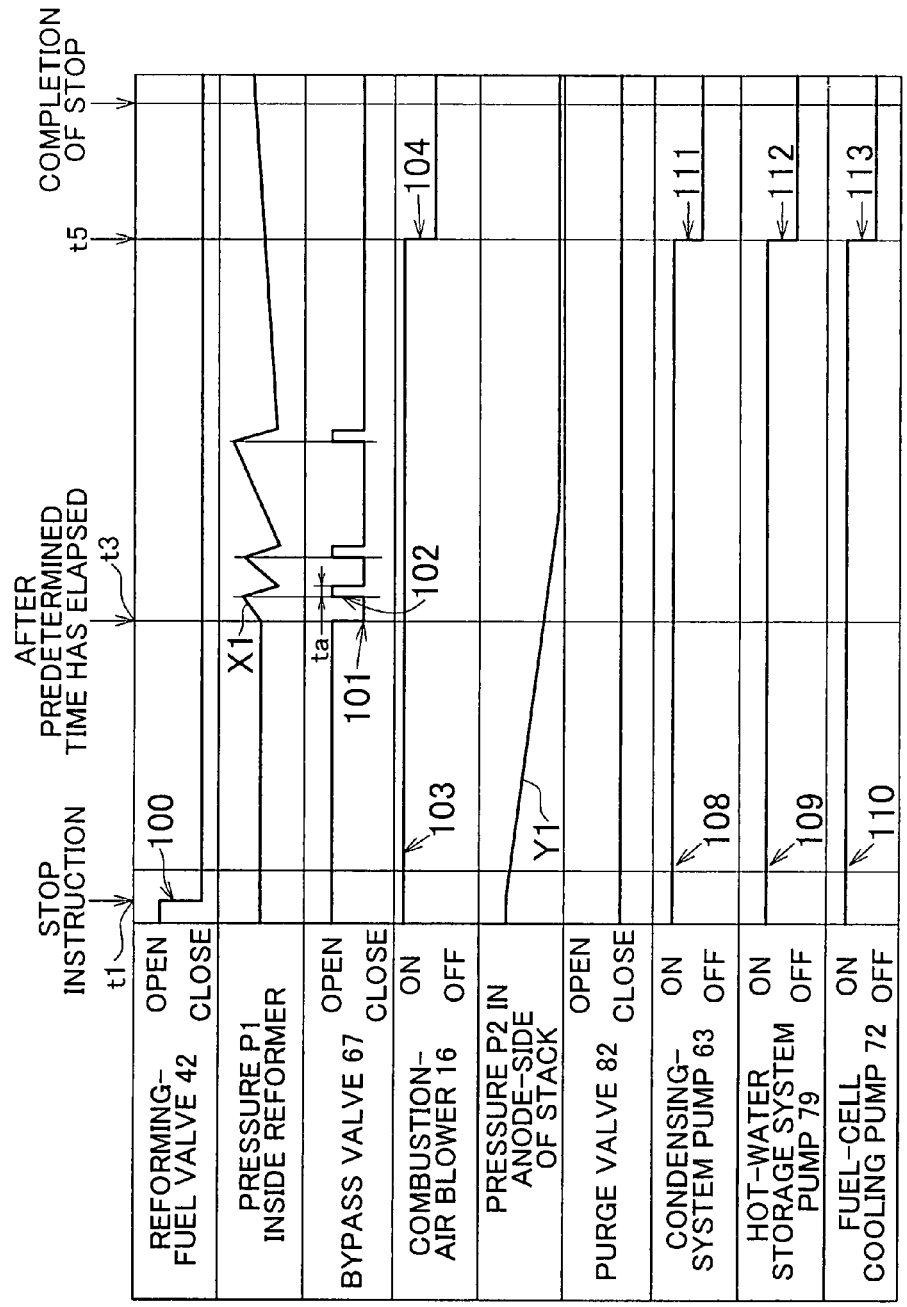
FIG. 3 is a timing chart showing a control B.
Figure 4:
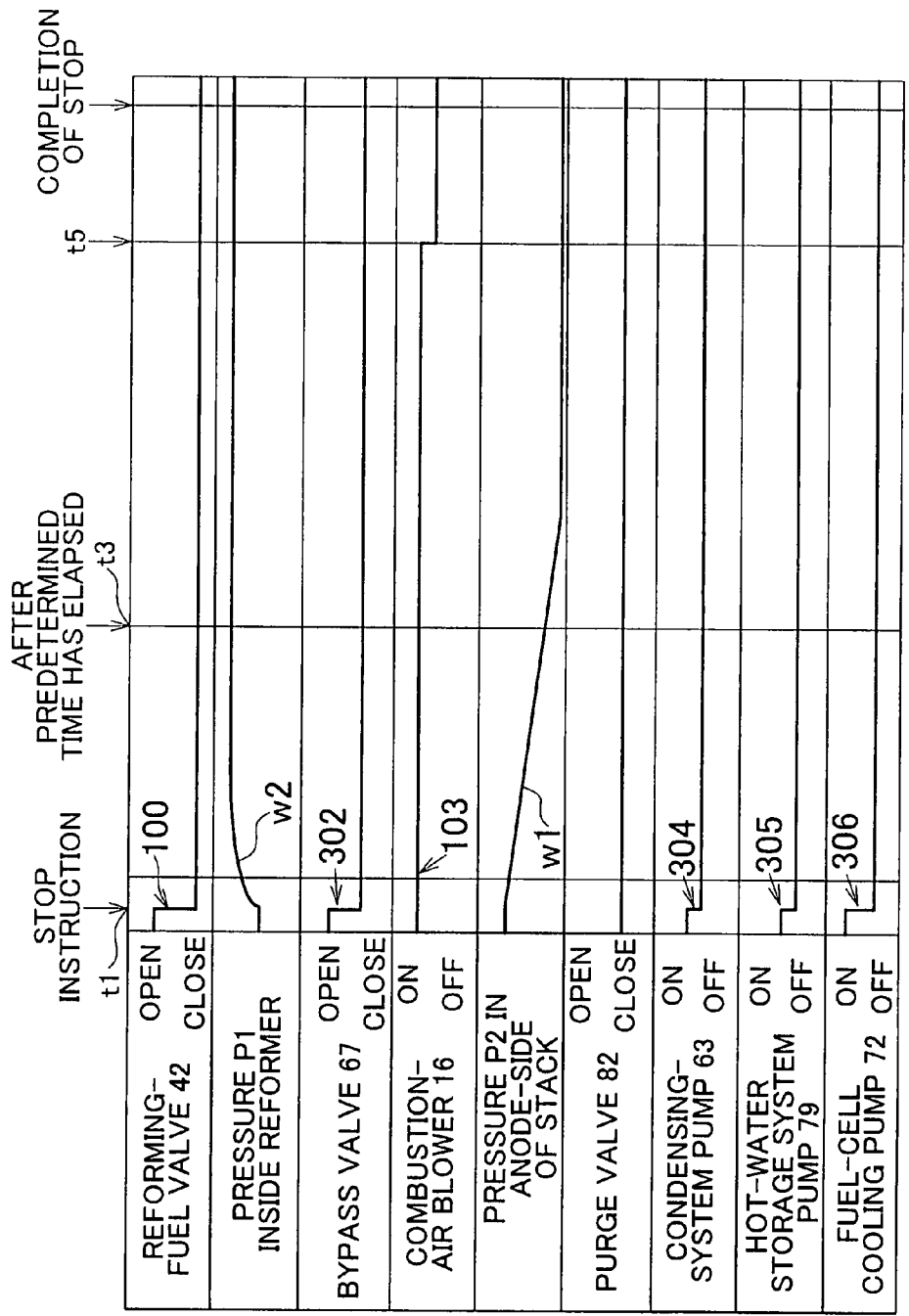
FIG. 4 is a timing chart showing a control C.
Figure 5:
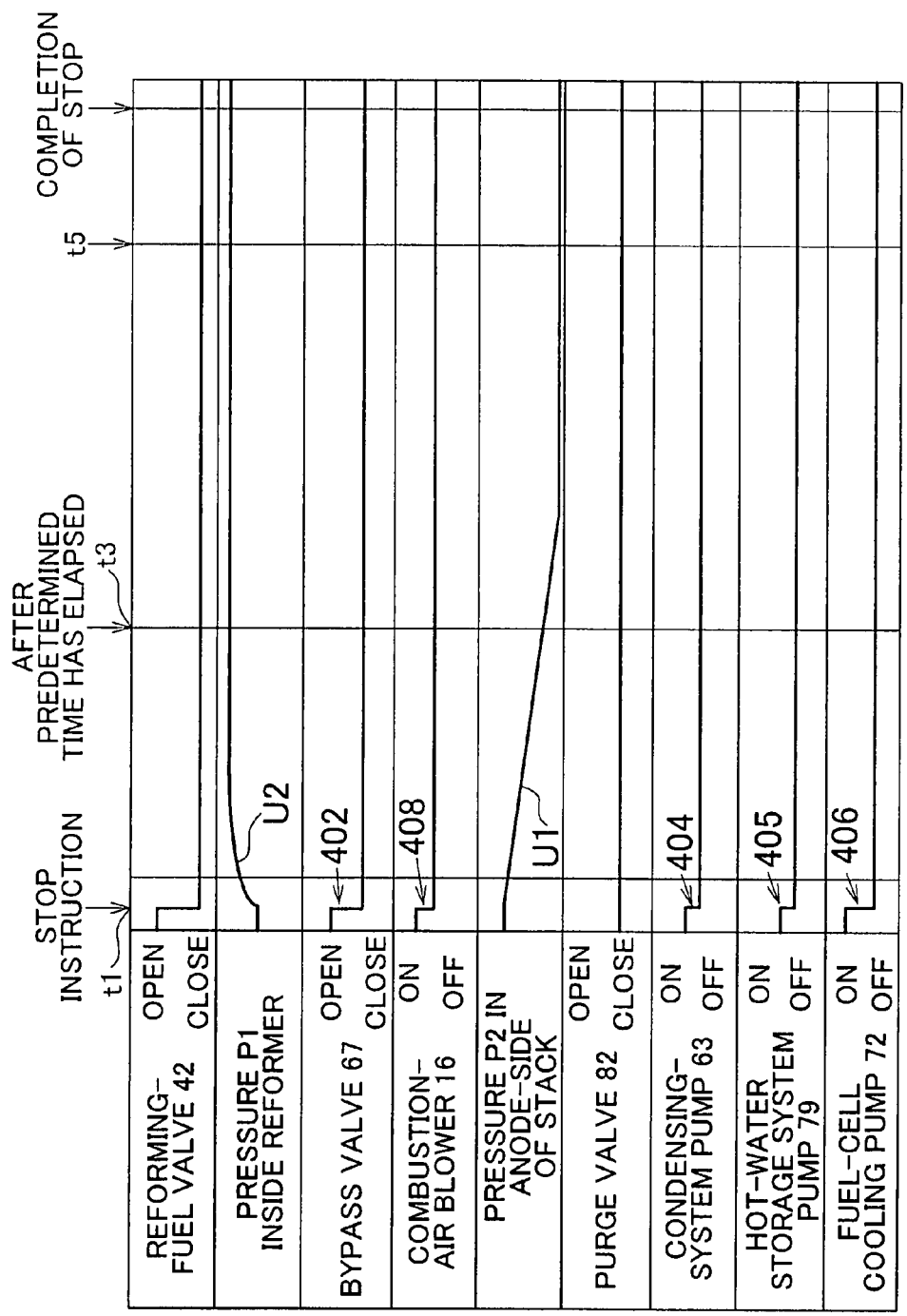
FIG. 5 is a timing chart showing a control D.

According to the embodiment, the control device 3 executes a control A shown in FIG. 2, a control B shown in FIG. 3, a control C shown in FIG. 4, or a control D shown in FIG. 5, according to the urgency of removing the cause of the malfunction. In each of FIG. 2 to FIG. 5, the horizontal axis indicates time. The controls A to D are configured to proceed with time so that no trouble is caused even if a malfunction occurs in at least one of the sensors. The control A is regarded as a normal stop control for the fuel cell system. The control A is also regarded as a stop control that is executed when a minor malfunction occurs in a component. The "minor malfunction in a component" signifies a malfunction in a component, which generally does not cause a secondary problem. The control B is regarded as a stop control that is executed, for example, when the output from the stack 2 is abnormal; a temperature abnormality occurs, the supply/discharge of water is abnormal, a gas leak occurs, or a malfunction occurs in an electric system. The control C is regarded as a stop control that is executed when a pressure abnormality occurs. The control D is regarded as a stop control that is executed, for example, when a malfunction occurs in an important component, the temperature inside a fuel cell system box is abnormal, a control abnormality occurs, or electric outage occurs. That is, the control D is executed when a malfunction, which is generally very likely to cause a secondary problem, occurs.

(Control A) FIG. 2 shows the control A. The control A is regarded as the control that is executed to stop the fuel cell system in a normal manner, when the fuel cell system is normally operated. Alternatively, the control A is regarded as the stop control that is executed when a minor malfunction occurs in a component. In this case, the control A is a stop control mode for stopping the fuel cell system when it is determined that no malfunction occurs in any constituent component. As shown in FIG. 2, the control device 3 opens the combustion-fuel valve 40 to supply the combustion fuel to the combustion portion 11, and opens the reforming-fuel valve 42 to supply the reforming fuel to the reformer 1 until a stop instruction for stopping the fuel cell system is output. When the control device 3 or an operator (for example, a user, or a person in charge of maintenance) outputs the stop instruction, the control device 3 closes the reforming-fuel valve 42 using a closing instruction 100. As a result, the control device 3 prohibits supply of the reforming fuel to the reforming portion 10, thereby suppressing the reforming reaction in the reforming portion 10. Similarly, the control device 3 closes the combustion-fuel valve 40, thereby prohibiting supply of the combustion fuel to the combustion portion 11. Thus, combustion is prohibited in the combustion portion 11.

Because the operation of the fuel cell system has just been stopped, the temperature of the reformer 1 is still high. Also, the reforming water in the liquid state, which remains inside the reforming portion 10 of the reformer 1, is evaporated. Therefore, the pressure P1 inside the reformer 1 gradually increases to a high value. If the bypass valve 67 is closed, the pressure inside the reformer 1, and the pressure in the passage that extends from the outlet $1p$ of the reformer 1, through the anode-gas passage 5, the condenser 50, the confluence portion $5w$, to the inlet 671 of the bypass valve 67, and to the inlet 521 of the supply valve 52 are increased to high values.

Therefore, although the stop instruction is output, the control device 3 opens the bypass valve 67 for a predetermined time. That is, the control device 3 opens the bypass valve 67 from time t1 at which the stop instruction is output, to time t3. This prevents the pressure P1 inside the reforming portion 10 of the reformer 1 from becoming excessively high. In this case, it is possible to suppress or avoid the occurrence of a malfunction in constituent components inside the reformer 1 due to excessive high pressure. When the predetermined time has elapsed after time t1 at which the stop instruction is output, that is, at time t3, the control device 3 closes the bypass valve 67 using a closing instruction 101, thereby hermetically sealing the reformer 1.

However, after time t3, the pressure P1 inside the reformer 1 may gradually increase due to evaporation of water that remains inside the reformer 1, as shown by the characteristic line X1 in FIG. 2. When the bypass valve 67 is closed as described above, the pressure inside the reformer 1, and the pressure in the passage that extends from the outlet $1p$ of the reformer 1, through the anode-gas passage 5, the condenser 50, the confluence portion $5w$, to the inlet 671 of the bypass valve 67, and to the inlet 521 of the supply valve 52 are increased to high values. Accordingly, when the pressure P1 inside the reformer 1 is increased to a predetermined value, the control device 3 opens the bypass valve 67 for a predetermined time ta using an instruction 102, thereby releasing the high pressure from the reformer 1. In this case, the high-pressure gas is discharged to the outside through the combustion-exhaust-gas passage $1m$. After the predetermined time ta has elapsed, the control device 3 closes the bypass valve 67 again. When the pressure P1 inside the reformer 1 is increased to the predetermined value, the control device 3 opens the bypass valve 67 again for the predetermined time ta, as described above.

Further, even after time t3, the control device 3 continues the operation of the combustion-air blower 16 using a continuation instruction 103. Thus, the combustion air is supplied to the combustion portion 11 of the reformer 1 as the air for cooling, thereby cooling the combustion portion 11 and the reformer portion 10 using the combustion air. In this case, because the supply of the combustion fuel to the combustion portion 11 is prohibited, fire is extinguished in the combustion portion 11. The temperature of the reformer 1 is decreased, and reaches a target value at time t5. At time t5, the reformer 1 including the combustion portion 11 has been cooled, and the temperature of the reformer 1 has already been decreased to a low value at time t5. Therefore, the control device 3 turns the combustion-air blower 16 off using an instruction 104, thereby prohibiting the supply of the combustion air to the combustion portion 11 of the reformer 1.

When the temperature of the reformer 1 is decreased, and reaches the target value at time t5, the control device 3 opens the reforming-fuel valve 42 for a predetermined time tc using an opening instruction 105 so that the reforming fuel (for example, hydrocarbon-based gas) is contained in the reformer 1. Thus, even if the reformer 1 is further cooled, it is possible to prevent the pressure inside the reformer 1 from becoming negative, and to improve the performance of protecting the inside of the reformer 1. This reduces the possibility that outside air or condensed water accidentally enters inside the reformer 1.

When the operation of the fuel cell system is stopped, the electric power generation is stopped in the stack 2 of the fuel cell 2, but water is generated due to reaction of the anode gas that remains inside the stack 2. Therefore, as shown by the characteristic line X2 in FIG. 2, the pressure P2 in the anode 21-side of the stack 2 of the fuel cell $2a$ gradually decreases. Accordingly, to prevent the pressure P2 in the anode 21-side of the stack 2 from becoming extremely negative, the control device 3 opens the purge valve 82 for a predetermined time tb using an opening instruction 106 so that the reforming fuel (for example, hydrocarbon-based gas) is contained in the anode 21 of the stack 2. Thus, the pressure in the anode 21 of the stack 2 is maintained at a high value. This prevents the pressure inside the stack 2 from becoming negative. Accordingly, it is possible to prevent the outside air from entering the stack 2. Thus, the catalyst inside the stack 2 is protected. When the pressure P2 in the anode 21-side of the stack 2 is decreased again, the control device 3 opens the purge valve 82 again for the predetermined time tb, using the instruction 106.

Further, the control device 3 continues to operate the condensing-system pump 63 using the continuation instruction 108, thereby supplying the coolant from the condensing-system pump 63 at a target flow rate until time t5. Further, the control device 3 continues to operate the hot-water storage pump 79 using a continuation instruction 109, thereby supplying the water from the hot-water storage pump 79 at a target flow rate until time t5. Also, the control device 3 continues to operate the fuel-cell cooling pump 72 using a continuation instruction 110, thereby supplying the coolant from the fuel-cell cooling pump 72 until time t5. In this case, because the condensing-system pump 63 is operating, the cooling performance in the condenser 50 is ensured, and the performance of cooling the anode gas flowing in the anode-gas passage 5 is appropriately ensured. Also, because the hot-water storage system pump 79 is operating, the cooling performance in the hot-water storage passage 77 is appropriately ensured. Thus, the performance of cooling related components is ensured. The cooling of the related components may be finished at time t5 at which the temperature of the reformer 1 (combustion portion 11) is sufficiently decreased. Therefore, the control device 3 turns the condensing-system pump 63 off using a stop instruction 111, and turns the hot-water storage system pump 79 off using a stop instruction 112, and turns the fuel-cell cooling pump 72 off using a stop instruction 113 at time t5.

According to the embodiment, when a minor malfunction occurs in a component or the like, the control device 3 stops the fuel cell system according to the above-described control A, that is, the same control mode as the stop control mode during normal operation.

(Control B) FIG. 3 shows the control B. Basically, the control B has the same configuration as that of the control A. The control B is regarded as a control that is executed when urgency of stopping the fuel cell system is higher than when the control A is executed. Hereinafter, the control B will be described with a focus on the differences between the control B and the control A. Because the operation of the fuel cell system is stopped, the pressure P2 in the anode 21-side of the stack 2 of the fuel cell 2a gradually decreases as shown by the characteristic line Y1 in FIG. 3. It is estimated that the pressure P2 gradually decreases due to the reaction of the anode gas that remains inside the stack 2, and the cooling of the stack 2.

In the control B, however, the control device 3 prohibits the purge valve 82 from being opened. That is, the control device 3 prohibits the supply of the reforming fuel to the anode 21 of the stack 2. In this case, an increase in the pressure in the anode 21 of the stack 2 is prevented. Thus, the supply of the reforming fuel to the anode 21 of the stack 2 continues to be stopped. In this case, because the pressure in the anode 21 of the stack 2 continues to gradually decrease, there is a possibility that the outside air enters the fuel cell 2a, oxidation of the catalyst proceeds in the fuel cell 2a, and accordingly the performance of the catalyst is changed. Although the possibility of occurrence of such a situation is taken into account, the control device 3 prohibits the supply of the reforming fuel to the anode 21 of the stack 2. This is because the reforming fuel is flammable, and therefore a secondary problem may be caused if the reforming fuel is supplied to the anode 21. Even if the performance of the catalyst in the fuel cell 2a is changed, the catalyst in the fuel cell 2a may be recovered when the control device 3 performs a post process for recovering the catalyst using the reformed gas containing hydrogen that has a reducing effect. Further, in the control B, the opening instruction 105, which is provided in the control A, is not provided. Accordingly, because the reforming fuel is not supplied into the reformer 1 that has been cooled, the pressure in the reformer 1 may become negative.

(Control C) FIG. 4 shows the control C. Basically, the control C has the same configuration as that of the control B. The control C is regarded as a control that is executed when the urgency of stopping the fuel cell system is even higher than when the control B is executed. Hereinafter, the control C will be described with a focus on the differences between the control C and the control B. That is, the control C is executed when the urgency of stopping the fuel cell system is even higher than when the control B is executed. Although the constituent components of the fuel cell system may be damaged, the control device 3 gives higher priority to execution of the control C, to more appropriately stop the fuel cell system.

In the control C, because the fuel cell system is stopped as in the control B, the pressure P2 in the anode 21-side of the stack 2 of the fuel cell 2a gradually decreases as shown by the characteristic line W1 in FIG. 4. In the control C, however, the control device 3 prohibits the purge valve 82 from being opened. Therefore, the pressure P2 in the anode 21 of the stack 2 continues to gradually decrease. Thus, the pressure P2 in the anode 21 of the stack 2 is permitted to become negative, and the property of the catalyst in the stack 2 is permitted to be changed.

Further, in the control C, when the stop instruction is output, the control device 3 closes the bypass valve 67 using a closing instruction 302, and does not open the bypass valve 67 thereafter. As a result, the control device 3 prohibits the operation for releasing the pressure from the reformer 1. Therefore, as shown by the characteristic line W2 in FIG. 4, the pressure P1 inside the reformer 1 gradually increases to a high value. In this case, the performance of the components related to the reformer 1 may be changed. Nevertheless, the control device 3 gives higher priority to execution of the control C. Thus, the control device 3 prohibits the bypass valve 67 from being opened, and permits the pressure in the reformer 1 to increase to a high value.

Further, in the control C, when the stop instruction for stopping the operation of the fuel cell system is output, the control device 3 prohibits the operation of the condensing-system pump 63 using a stop instruction 304, prohibits the operation of the hot-water storage system pump 79 using a stop instruction 305, and prohibits the operation of the fuel-cell cooling pump 72 using a stop instruction 306. As a result, it is possible to avoid heat generation due to the operation of the condensing-system pump 63, heat generation due to the operation of the hot-water storage system pump 79, and heat generation due to the operation of the fuel-cell cooling pump 72. In this case, however, because the water (or coolant) does not flow in the coolant passage 62 of the condensing system 60, in the fuel-cell cooling passage 71, and in the hot-water storage passage 77, the performance of cooling the fuel cell system may be deteriorated. Nevertheless, the control device 3 prohibits the operations of the condensing-system pump 63, the hot-water storage system pump 79, and the fuel-cell cooling pump 72, and permits deterioration of the performance of cooling the fuel cell system. In the control C, however, the control device 3 continues the operation of the combustion-air blower 16 using the continuation instruction 103, thereby supplying the combustion air to the combustion portion 11 through the combustion-air passage 17, as in the control B. Thus, the control device 3 improves the performance of cooling the reformer 1, that is, promotes the cooling of the combustion portion 11 and the reforming portion 10. This is because the temperature of the reformer 1 is high until immediately before the power-generation operation of the fuel cell system is stopped, and therefore, the reformer 1 needs to be cooled.

(Control D) FIG. 5 shows the control D. Basically, the control D has the same configuration as that of the control C. The control D is regarded as a control that is executed when the urgency of stopping the fuel cell system is higher than when the control C is executed, and a secondary damage may be caused in the fuel cell system. That is, the control D is executed when the urgency of stopping the fuel cell system is highest. Although the constituent components may be damaged, the control device 3 gives higher priority to execution of the control D. Hereinafter, the control D will be described with a focus on the differences between the control D and the control C. In the control D, because the power-generation operation of the fuel cell system is stopped as in the control C, the pressure P2 in the anode 21 of the stack 2 of the fuel cell 2a gradually decreases as shown by the characteristic line U1 in FIG. 5. However, the control device 3 closes the purge valve 82, and prohibits the purge valve 82 from being opened. Therefore, the pressure P2 in the anode 21 of the stack 2 continues to gradually decrease, as shown by the characteristic line U1 in FIG. 5.

In the control D, when the stop instruction for stopping the fuel cell system is output, the control device 3 prohibits the bypass valve 67 from being opened using a closing instruction 402. That is, the control device 3 prohibits the operation for releasing the pressure from the reformer 1. Thus, the pressure P1 inside the reformer 1 gradually increases, as shown by the characteristic line U2.

Further, in the control D, when the stop instruction for stopping the fuel cell system is output, the control device 3 prohibits the operation of the condensing-system pump 63 using a stop instruction 404, prohibits the operation of the hot-water storage system pump 79 using a stop instruction 405, and prohibits the operation of the fuel-cell cooling pump 72 using a stop instruction 406. Therefore, it is possible to avoid heat generation due to the operation of the condensing-system pump 63, heat generation due to the operation of the hot-water storage system pump 79, and heat generation due to the operation of the fuel-cell cooling pump 72. In this case, however, the water (or coolant) does not flow in the coolant passage 62 of the condensing system 60, in the fuel-cell cooling passage 71, and in the hot-water storage passage 77. Therefore, the performance of cooling the fuel cell system may be deteriorated. Nevertheless, the control device 3 prohibits the operations of the condensing-system pump 63, the hot-water storage system pump 79, and the fuel-cell cooling pump 72.

In the control D, the control device 3 stops the operation of the combustion-air blower 16, and prohibits the operation of the combustion-air blower 16, using a stop instruction 408, unlike in the control C. As a result, the cooling operation of supplying air for cooling to the combustion portion 11 of the reformer 1 through the combustion-air passage 17 is prohibited. That is, the cooling of the combustion portion 11 and the reforming portion 10 is prohibited.

As described above, in the control D, the control device 3 turns the combustion-air blower 16 off using the stop instruction 408. Accordingly, the combustion air for cooling is not supplied to the combustion portion 11 of the reformer 1, and is not supplied to the reformer 1 either. Thus, the combustion portion 11 of the reformer 1 and the reformer 1 are spontaneously cooled. Because the combustion air supports combustion, the supply of the combustion air for cooling to the reformer 1 is stopped to avoid a secondary change of the performance of the fuel cell system or a secondary damage to the fuel cell system.

As described above, in the control D, when the stop instruction for stopping the fuel cell system is output, the control device 3 stops the supply of the reforming fuel to the reformer 1, closes the bypass valve 67, stops the supply of the combustion air, stops the operation of the condensing-system pump 63, stops the operation of the hot-water storage system pump 79, and stops the operation of the fuel-cell cooling pump 72. Although a secondary malfunction may be caused in the control D, the control D needs to be executed when the urgency of stopping the fuel cell system is extremely high. If a secondary malfunction occurs in a component, the malfunctioning component needs to be replaced with a new one, or needs to be repaired.

According to the embodiment, when a malfunctioning component is identified, and the control device 3 executes the control that includes a stop process in which the malfunctioning component is used, the control device 3 executes the control to stop the fuel cell system without using the malfunctioning component. For example, the control device 3 may monitor the temperature of the combustion portion 11 of the reformer 1, and may execute the normal stop control. In this case, if a malfunction occurs in a temperature sensor, and the malfunctioning temperature sensor is identified, the control device 3 executes the control for stopping the fuel cell system based on the elapsed time, without using the signal from the malfunctioning temperature sensor.

Figure 6:
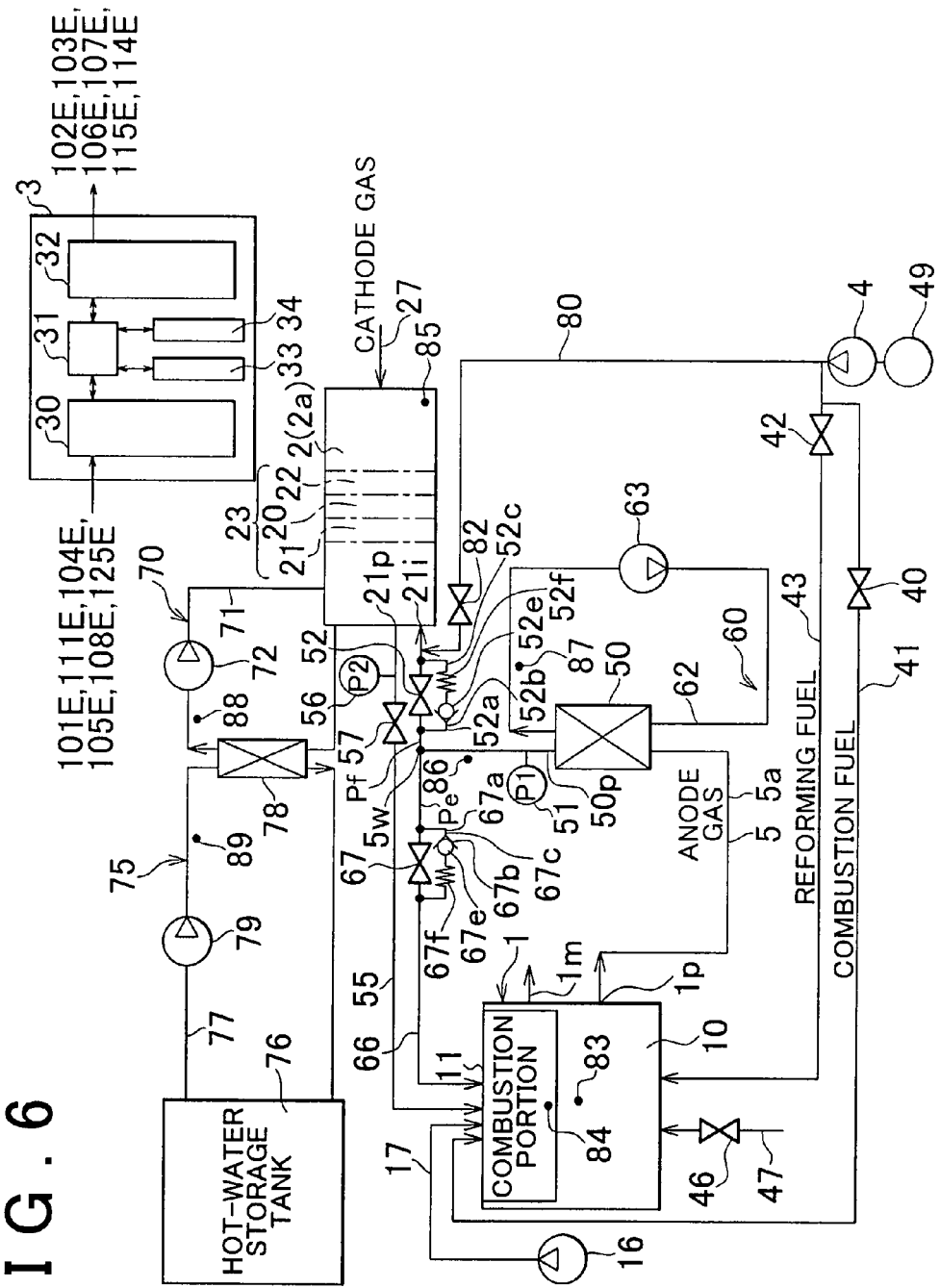
FIG. 6 is a block diagram showing a fuel cell system according to a second embodiment.

FIG. 6 shows a second embodiment. Hereinafter, the second embodiment will be described with a focus on the differences between the second embodiment and the first embodiment. In the first embodiment, when the power-generation operation of the fuel cell system is stopped, the water that remains inside the reformer 1 is evaporated by residual heat in the reformer 1. In the first embodiment, in the control C, the control device 3 prohibits the bypass valve 67 from being opened, as shown in FIG. 4. Therefore, the pressure P1 inside the reformer 1 gradually increases to a high value. In the control D as well, the pressure P1 inside the reformer 1 gradually increases to a high value, as shown in FIG. 5. In this case, depending on a stop condition, the pressure P1 may become excessively high, and the components related to the reformer 1 may be damaged.

Accordingly, in the second embodiment, the control device 3 basically operates the valves and pumps in one of the controls A to D, according to the cause of a malfunction of the fuel cell system (however, the curves that indicate the increases in the pressure P1 and the pressure P2 differ from those in the first embodiment). Further, in the second embodiment, the following mechanical structure is employed. That is, the bypass valve 67 is an electromagnetic valve that is opened according to an instruction provided by the control device 3. The bypass valve 67 is opened and closed by an electromagnetic solenoid. Also, the bypass valve 67 includes a relief portion 67a that is a mechanical check valve that is mechanically opened in response to the pressure.

The relief portion 67a includes a passage 67c, a movable valve element 67e, and a spring member 67f. The passage 67c has a valve opening 67b that is normally closed. The valve element 67e closes the valve opening 67b of the passage 67c. The spring member 67f is a force-applying member that applies force to the valve element 67e in such a direction that the valve element 67e closes the valve opening 67b. The valve opening 67b is provided in parallel with the bypass passage 66 (the valve opening of the bypass valve 67). Normally, the valve opening 67b is mechanically closed by the valve element 67e due to the urging force of the spring member 67f.

Even when the control device 3 prohibits the bypass valve 67 from being opened, if an input pressure Pe (refer to FIG. 6) upstream of the bypass valve 67 exceeds a set pressure Pk1 at which the relief portion 67a is opened, the valve element 67e of the relief portion 67a is mechanically retracted while resisting the force of the spring member 67f, regardless of the control executed by the control device 3. Thus, the valve opening 67b of the relief portion 67a is automatically opened. In this case, the valve opening 67b of the relief portion 67a is mechanically opened in response to the pressure Pe upstream of the bypass valve 67. In this case, although the bypass valve 67, which is the electromagnetic valve, is not opened, the high-pressure gas inside the reformer 1 is delivered to the combustion portion 11, and then discharged to the outside through the combustion-exhaust-gas passage 1m. This prevents the pressure inside the reformer 1 from becoming excessively high. Therefore, the performance of protecting the constituent components of the reformer 1 is improved. Thus, the relief portion 67a functions as the reformer excessive high-pressure prevention means.

Further, in the second embodiment, the supply valve 52, which is positioned upstream of the anode of the stack 2, is an electromagnetic valve that is opened and closed according to an instruction provided by the control device 3. The supply valve 52 is opened and closed by an electromagnetic solenoid. Also, the supply valve 52 includes a relief portion 52a that is a mechanical check valve that is mechanically opened in response to the pressure. As shown in FIG. 6, the relief portion 52a includes a passage 52c, a movable valve element 52e, and a spring member 52f. The passage 52c has a valve opening 52b that is normally closed. The valve element 52e closes the valve opening 52b of the passage 52c. The spring member 52f is a force-applying member that applies force to the valve element 52e in such a direction that the valve element 52e closes the valve opening 52b. The valve opening 52b is provided in parallel with the anode-gas passage 5 (the valve opening of the supply valve 52). Normally, the valve opening 52b is mechanically closed by the valve element 52e due to the force of the spring member 52f.

Even when the control device 3 prohibits the supply valve 52 from being opened, if an input pressure Pf (refer to FIG. 6) upstream of the supply valve 52 exceeds a set pressure Pk2 at which the relief portion 52a is opened, the valve element 52e of the relief portion 52a is mechanically retracted while resisting the force of the spring member 52f, regardless of the control executed by the control device 3. Thus, the valve opening 52b of the relief portion 52a is automatically opened. In this case, the valve opening 52b of the relief portion 52a is mechanically opened in response to the pressure Pf upstream of the supply valve 52. In this case, although the supply valve 52 is not opened, the gas is supplied to the anode 21 of the stack 2. This prevents the pressure in the anode 21-side from becoming excessively negative. Therefore, it is possible to reduce the possibility that the outside air enters the anode 21 of the stack 2. This improves the performance of protecting the catalyst in the stack 2. Thus, the relief portion 52a functions as the anode excessive negative-pressure prevention means.

In the second embodiment, the bypass valve 67 and the relief portion 67a may be integrally provided. Alternatively, the bypass valve 67 and the relief portion 67a may be provided separately from each other. The supply valve 52 and the relief valve 52a may be integrally provided. Alternatively, the supply valve 52 and the relief valve 52a may be provided separately from each other. The relation between the set pressure Pk1 at which the relief portion 67a is opened, and the set pressure Pk2 at which the relief portion 52a is opened may be set as follows. The set pressure Pk1 may be higher than the set pressure Pk2 (Pk1>Pk2); the set pressure Pk1 may be lower than the set pressure Pk2 (Pk1<Pk2); the set pressure Pk1 may be equal to the set pressure Pk2 (Pk1=Pk2); and the set pressure Pk1 may be substantially equal to the set pressure Pk2. When the set pressure Pk1 is higher than the set pressure Pk2 (Pk1>Pk2), the gas inside the reformer 1 is preferentially discharged to the anode 21 of the stack 2. Therefore, it is possible to appropriately prevent the pressure P2 in the anode 21 of the stack 2 from becoming excessively negative. In the second embodiment, both of the relief portion 67a and the relief portion 52a are provided. However, only one of the relief portion 67a and the relief portion 52a may be provided.

Figure 7:
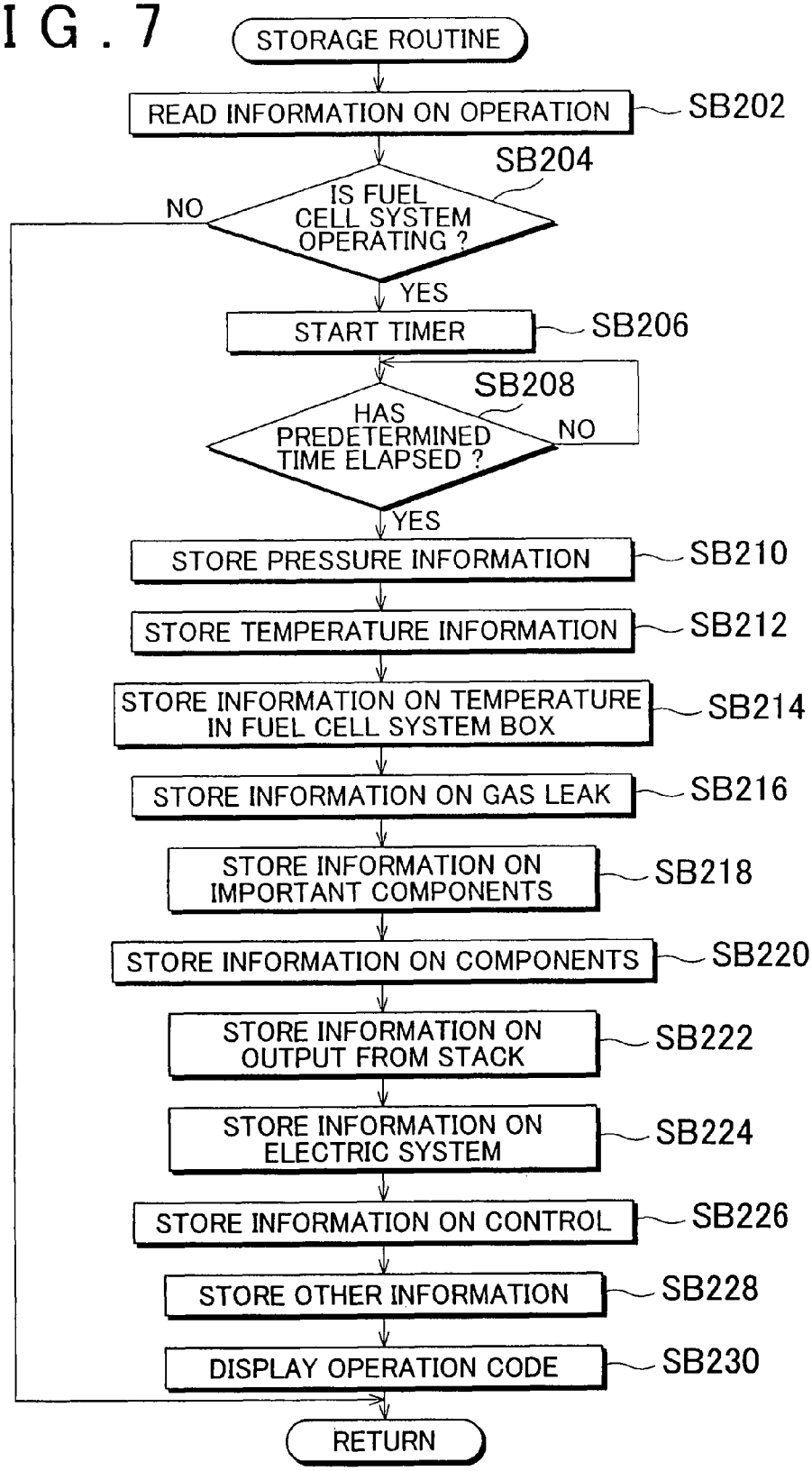
FIG. 7 is a flowchart showing a storage routine executed by a control device according to a third embodiment.

FIG. 7 to FIG. 9B show a third embodiment. FIG. 1 to FIG. 6 may be used to show portions that have the same configurations as in the first or second embodiment. Hereinafter, the third embodiment will be described with a focus on the differences between the third embodiment and the first and second embodiments. FIG. 7 shows a flowchart of a storage routine executed by the control device 3 when the power-generation operation is performed. The flowchart of the storage routine is not limited to this flowchart. First, the control device reads information on the operation of the fuel cell system (step SB202), and determines whether the fuel cell system is operating (i.e., whether the fuel cell system is in one of the start mode, the power-generation operation mode, and the stand-by mode) (step SB204). When the fuel cell system is operating, the control device 3 starts a timer (step SB206), and determines whether a predetermined time has elapsed (step SB208). When the predetermined time has elapsed, the control device 3 reads and stores pressure information (step SB210). Next, the control device 3 reads and stores temperature information (step SB212). Next, the control device 3 reads and stores information on the temperature in the fuel cell system box (step SB214). Next, the control device 3 reads and stores information on a gas leak (step SB216). Next, the control device 3 reads and stores information on important components (step SB218). Next, the control device 3 reads and stores information on components that are not important (step SB220). Next, the control device 3 reads and stores information on the output from the stack 2 (step SB222). Next, the control device 3 reads and stores information on the electric system (step SB224). Next, the control device 3 reads and stores information on the control system (step SB226). Next, the control device 3 reads and stores the other information (step SB228). As the other information, the control device 3 stores the time period during which the fuel cell system is operating, and the number of times that the fuel cell system is started. Thus, the control device 3 stores the accumulated time period during which the fuel cell system is operating, and the accumulated number of times that the fuel cell system is started. Further, the control device 3 outputs an instruction for displaying a current operation code (step SB230), and then the routine returns to a main routine. The control device 3 stores each information by writing each information in a predetermined corresponding area of the second memory 34 (nonvolatile memory).

According to the second embodiment, even when the operation of the fuel cell system is stopped, for example, each information, such as the operating state of each constituent component and a value output from each sensor immediately before the operation of the fuel cell system is stopped, is stored in the predetermined corresponding area of the second memory 34 (nonvolatile memory).

Figure 8:
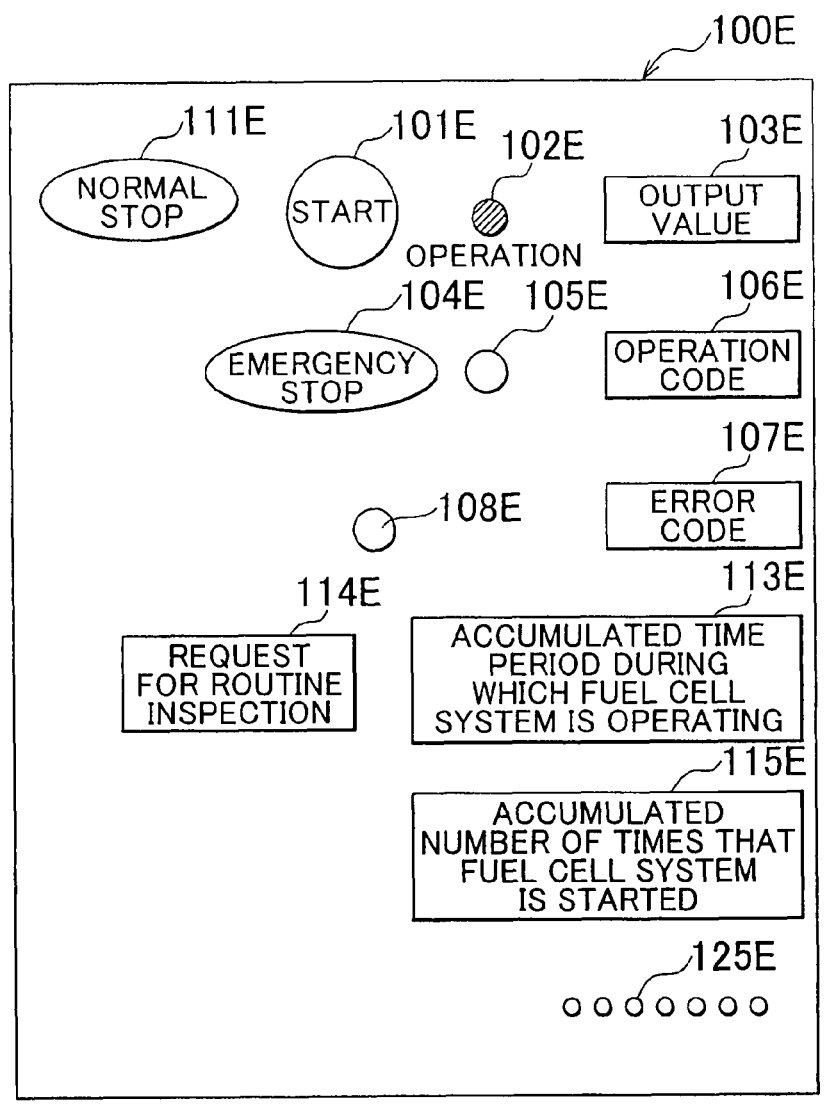
FIG. 8 is a front view showing an operation panel according to the third embodiment.

FIG. 8 is an operation panel 100E of the fuel cell system, which is operated by an operator (for example, a user, or a person in charge of maintenance). The operation panel 100E is provided at such a position that the operator can easily operate the operation panel 100E. As shown in FIG. 8, the operation panel 100E includes the start switch 101E, the switch 111E (the normal stop operating device), the operating-state display portion 102E, the display portion 103E, the emergency stop switch 104E (the emergency stop operating device), the warning device stop switch 105E (the warning stop operating device), the first display portion 106E, the second display portion 107E, the reset switch 108E (the restriction stop operating device, the reset operating device, or the restart switch), the display portion 113E, the display portion 115E, the display portion 114E, and the DIP switches 125E (the operation-changing operating device). The start switch 101E starts the fuel cell system. The switch 111E stops the power-generation operation of the fuel cell system. The operating-state display portion 102E displays whether the fuel cell system is presently operating. The display portion 103E displays the current value of the output from the fuel cell system. The emergency stop switch 104E brings the operation of the fuel cell system to an emergency stop. The warning device stop switch 105E is used by an operator (for example, a user, or a person in charge of maintenance) to stop a warning device (a buzzer) when the warning device (the buzzer, or warning means) is operated to inform that a malfunction occurs in the fuel cell system (for example, the power-generation operation is stopped, or interrupted). The first display portion 106E displays the current operation code of the fuel cell system. The second display portion 107E displays an error code when the fuel cell system is stopped because of a malfunction. The reset switch 108E is operated by an operator to start the fuel cell system for the first time after the operation of the fuel cell system is brought to an emergency stop because of a malfunction. The display portion 113E displays the accumulated time period during which the fuel cell system is operating (generally, the accumulated time period during which power-generation operation is performed). The display portion 115E displays the accumulated number of times that the fuel cell system is started. The display portion 114E indicates that an inspection, such as a routine inspection, needs to be performed when the accumulated time period during which the fuel cell is operating exceeds a predetermined time period, and/or the accumulated number of times that the fuel cell system is started exceeds a predetermined number of times. The DIP switches 125E are used to input instructions for different functions to the fuel cell system.

The switches are operated by an operator. Signals output from the switches are input to the control device 3. The above-described emergency stop switch 104E (the emergency stop operating device) is provided separately from the switch 111E (the normal stop operating device). The place in which the emergency stop switch 104E is provided is not limited to the operation panel 100E. The emergency stop switch 104E may be provided on a remote-control panel provided in a building, or may be provided in the main body (the hot-water storage unit and/or the stack unit) so that the operator can easily operate the emergency stop switch 104E when a malfunction occurs in the fuel cell system. Settings may be made such that the control C or the control D starts when the emergency stop switch 104E is operated. The control C and the control D are the controls that are executed when the emergency of stopping the fuel cell system is high.

The second memory 34 of the control device 3 stores the accumulated time period during which the fuel cell system is operating, and the accumulated number of times that the fuel cell system is started. When the accumulated time period during which the fuel cell system is operating exceeds a predetermined first time period Wa1, and/or the accumulated number of times that the fuel cell is started exceeds a predetermined first number of times Wa1', the control device 3 outputs, to the display portion 114E, an instruction for instructing the display portion 114E to indicate that the routine inspection needs to be performed. Further, when the accumulated time period during which the fuel cell system is operating exceeds a predetermined second time period Wa2 (Wa2>Wa1), and/or the accumulated number of times that the fuel cell is started exceeds a predetermined second number of times Wa2' (Wa2'>Wa1'), the control device 3 outputs the instruction for instructing the display portion 114E to indicate that the routine inspection needs to be performed, and an instruction for stopping part of, or all of the function of the fuel cell system.

The reset switch 108E is an operating device for resetting the fuel cell system when the fuel cell system is restarted. After the fuel cell system is brought to an emergency stop, the control device 3 outputs the instruction for restricting part of, or all of the function of the fuel cell system, unless the reset switch 108 is operated. In this case, for example, the supply of the fuel to the fuel electrode of the fuel cell is stopped, the supply of the oxidant gas to the oxidant electrode of the fuel cell is stopped, and/or the operation of the reformer is stopped. The control device 3 may have a unitary construction, or may be formed by combining a plurality of control portions.

The above-described operation codes include the code No. 1 to code No. 4. The code No. 1 indicates a stand-by mode. In the stand-by mode, the auxiliary machines are off, the reformer 1 is not operated, and the fuel cell 2a is not generating electric power. The code No. 2 indicates a starting mode. In the starting mode, the reformer 1 is started, and the fuel cell 2a is not generating electric power. The code No. 3 indicates a power-generation operation mode. In the power-generation operation mode, the reformer 1, which has been started, is generating the reformed gas, and the fuel cell 2a is generating electric power. The code No. 4 indicates a stop mode. In the stop mode, the reformer 1, which has generated the reformed gas, is stopped, and the stack 2 of the fuel cell 2a, which has generated electric power, is stopped.

A plurality of error codes is set. The error codes indicate respective malfunctions or respective problems of the constituent components of the fuel cell system. For example, the error code No. 100 indicates that a pressure abnormality occurs. The error code No. 101 indicates that a temperature abnormality occurs. The error code No. 102 indicates the temperature inside the fuel cell system box is abnormal. The fuel cell system box is the outer housing of the fuel cell system. The error code No. 103 indicates that the supply/discharge of water is abnormal. The error code No. 104 indicates that a gas leak occurs. The error code No. 105 indicates that a malfunction, which is likely to cause a secondary malfunction or problem, occurs in an important component. The error code No. 106 indicates that a malfunction occurs in a component that is not important. The error code No. 107 indicates that the output from the stack 2 is abnormal. The error code No. 108 indicates that a malfunction occurs in the electric system. The error code No. 109 indicates that a control abnormality occurs. The error code No. 110 indicates that electric outage occurs.

Figure 9A:
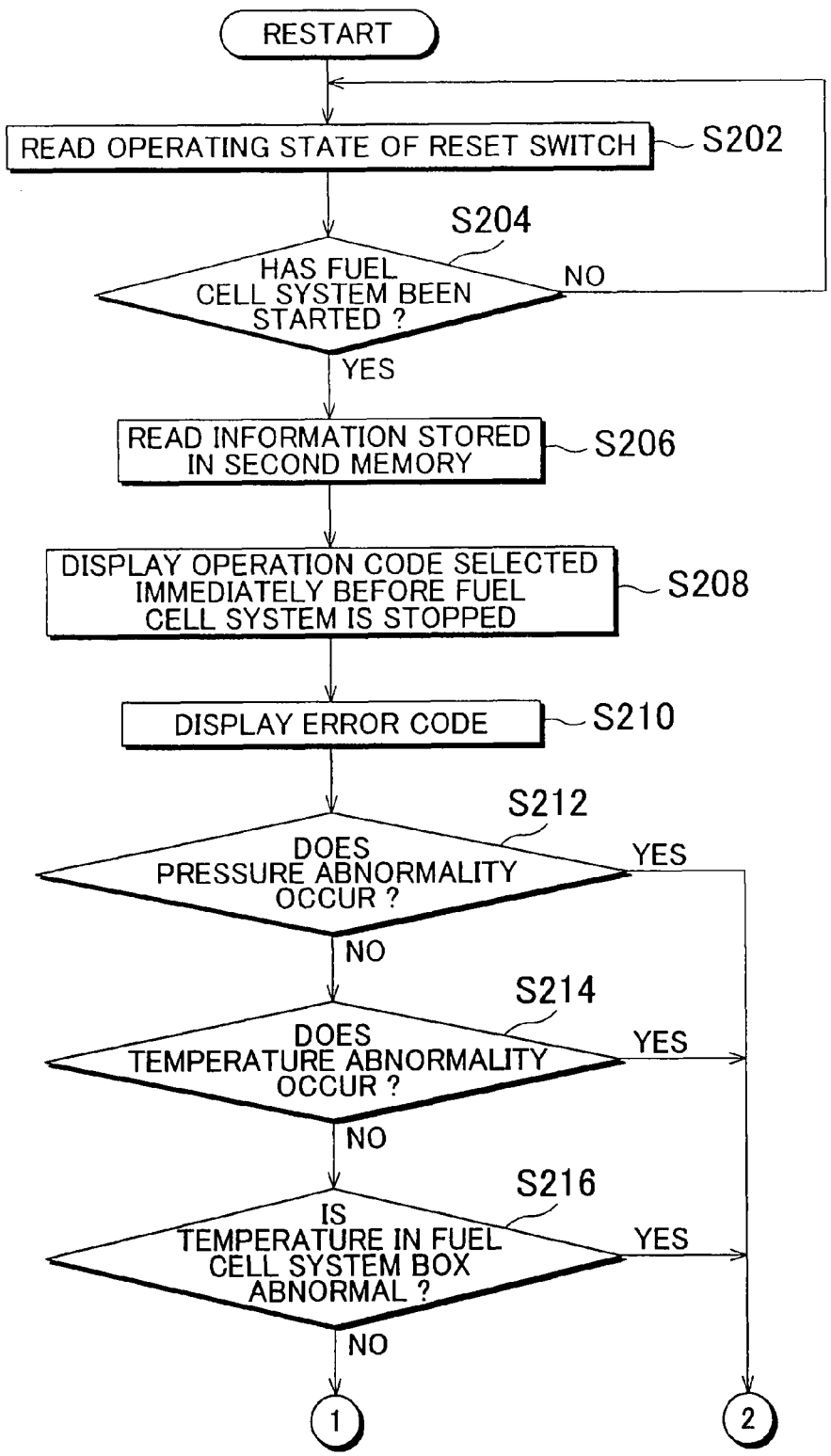
FIG. 9A and FIG. 9B are a flowchart showing a restart routine executed by the control device according to the third embodiment.
Figure 9B:
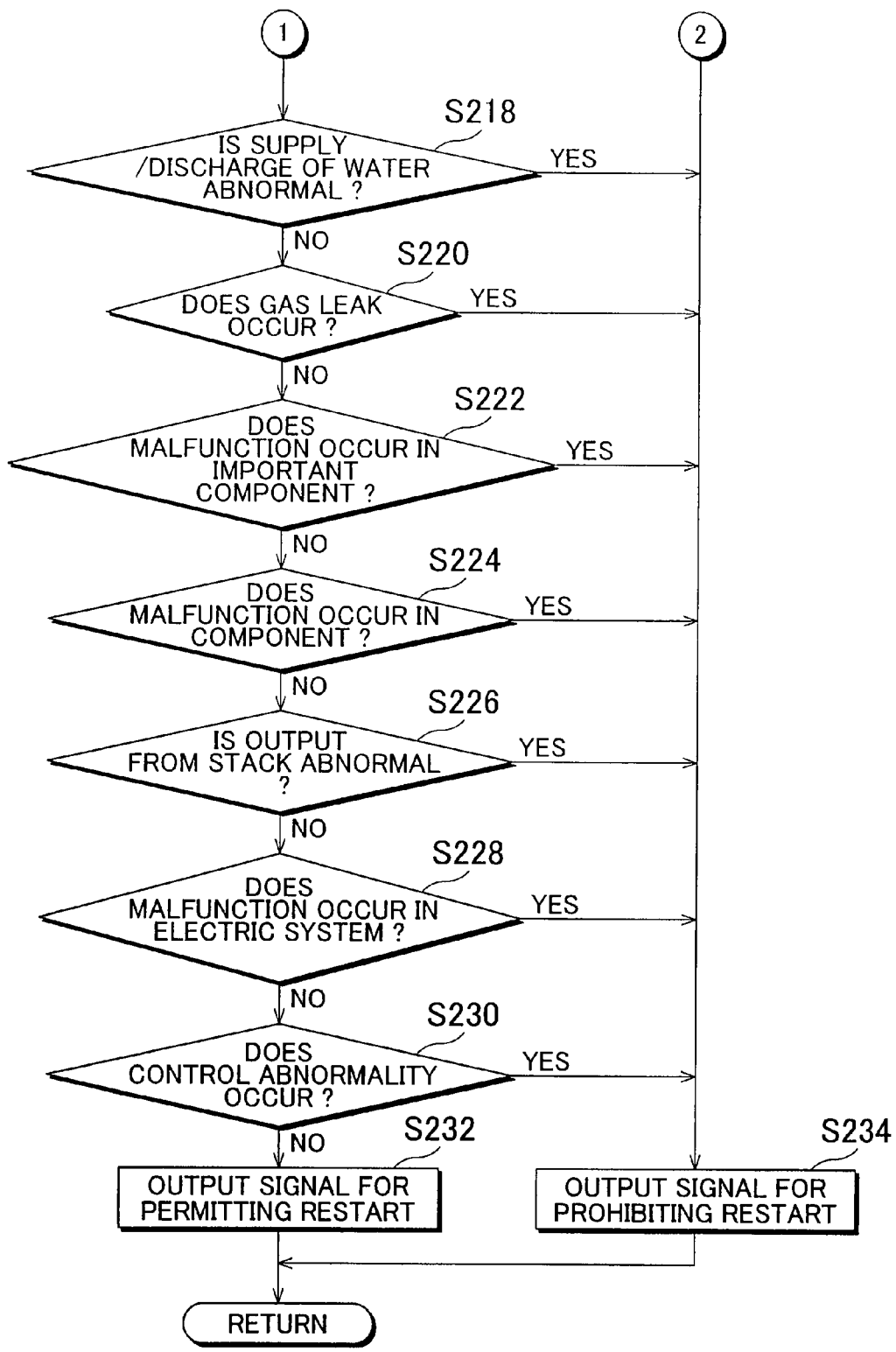

FIG. 9A and FIG. 9B are a flowchart of a routine that is executed by the control device 3 when an operator (for example, a user, or a person in charge of maintenance) restarts the fuel cell system after the fuel cell system is stopped because of a malfunction or the like. As shown in FIG. 9A and FIG. 9B, the control device 3 reads the operating state of the reset switch 108E that is operated by an operator (for example, a user, or a person in charge of maintenance) (step S202). When the reset switch 108E has been operated to start the fuel cell system (YES in step S204), the control device 3, which constitutes the restart control means, preferentially reads the operating state of the fuel cell system immediately before the fuel cell system is stopped, which is stored in the second memory 34 (nonvolatile memory) (step S206).

The control device 3 causes the first display portion 106E of the operation panel 100E to display the operation code selected immediately before the fuel cell system is stopped (step S208). When the operation code differs from the standby code, it is estimated that the fuel cell system is stopped due to electric outage of a commercial power supply system. Further, the control device 3 causes the second display portion 107E to display the error code selected when the fuel cell system is stopped (step S210). An operator (for example, a user, or a person in charge of maintenance) determines the cause of the malfunction of the fuel cell system based on the error code.

The control device 3 executes a diagnostic mode to determine whether a malfunction occurs in a constituent component of the fuel cell system. That is, the control device 3 determines whether a pressure abnormality occurs (step S212). Next, the control device 3 determines whether a temperature abnormality occurs (step S214). Next, the control device 3 determines whether the temperature inside the fuel cell system box is abnormal (step S216). Next, the control device 3 determines whether the supply/discharge of water to/from the fuel cell system is abnormal (step S218). Next, the control device 3 determines whether a gas leak occurs (step S220). Next, the control device 3 determines whether a malfunction occurs in an important component (step S222). Next, the control device 3 determines whether a malfunction occurs in a component that is not important (step S224). Next, the control device 3 determines whether the output from the stack 2 is abnormal (step S226). Next, the control device 3 determines whether a malfunction occurs in the electric system (step S228). The control device 3 determines whether a control abnormality occurs (step S230). Next, when it is determined that the constituent components are in normal states, and therefore the fuel cell system may be started without any problem, based on the results of determinations made in the diagnostic mode, the control device 3 outputs a signal for permitting the restart of the fuel cell system (step S232, the restart permission means). When it is determined that at least one of the constituent components is not in the normal state, and therefore a problem may occur if the fuel cell system is started, based on the results of determinations made in the diagnostic mode, the control device 3 outputs a signal for prohibiting the restart of the fuel cell system (step S234, the restart prohibition means).

FIG. 1 may be used to show portions of the configuration of a fourth embodiment, which are the same as those of the configuration of the first embodiment. The control device 3 executes a first control, a second control, or a third control, according to the severity or type of the cause of a malfunction of the fuel cell system. The first control prohibits the supply of the reformed gas to the stack 2 of the fuel cell 2a, by closing the supply valve 52, and interrupting the communication between the outlet 1p of the reformer 1 and the inlet 21i of the anode 21 of the stack 2. In this case, because the reformed gas is not supplied to the anode 21 of the stack 2, the pressure in the anode 21 of the stack 2 is permitted to become negative.

The second control prohibits the supply of the reformed gas to the stack 2 of the fuel cell 2a as described above, and also prohibits the supply of the reforming fuel to the reformer 1 by closing the reforming-fuel valve 42. In this case, because the reformed gas is not supplied to the anode 21 of the stack 2 as in the first control, the pressure in the anode 21 of the stack 2 is permitted to become negative. Further, the supply of the reforming fuel to the reformer 1 is prohibited, in addition to the control that is the same as the first control. Therefore, the reforming reaction is restricted in the reformer 1, and the generation of the reformed gas is prohibited in the reformer 1. The third control prohibits the supply of the reformed gas to the stack 2 of the fuel cell 2a, and prohibits the supply of the reforming fuel to the reformer 1 by closing the reforming-fuel valve 42 as described above, and further prohibits the supply of the combustion air to the combustion portion 11 of the reformer 1 by turning the combustion-air blower 16 off. In this case, the supply of the combustion air, which aids combustion, to the combustion portion 11 of the reformer 1 is further prohibited, in addition to the control that is the same as the first control and the second control.

FIG. 1 to FIG. 9B may be used to show portions of the configuration of a fifth embodiment, which are the same as those of the configurations of the first to fourth embodiments.

In the fifth embodiment, when it is determined that an earthquake occurs (for example, when a falling determination portion determines that the hot-water storage tank 76 and/or the stack 2 are/is falling, and therefore earthquake determination means determines that an earthquake occurs), if the urgency of stopping the fuel cell system is low, the control device 3 selects the control A or the control B. If the urgency of stopping the fuel cell system is high, the control device 3 selects the control C or the control D. Whenever an earthquake intensity is high, the control device 3 selects the control D. When the earthquake intensity is low, the control device 3 may select the control A or the control B. Further, when it is determined that an earthquake occurs, the control device 3 may output instructions for closing the valves in the passages through which the hot water in the hot-water storage tank 76 and the hot coolant in the fuel-cell cooling system 70 flow, to the valves in the passages to prevent the hot water and hot coolant from flowing out of the fuel cell system. Further, the control device 3 may output an instruction for stopping the hot-water storage system pump 79 of the hot-water storage system 75, and may output an instruction for stopping the fuel-cell cooling pump 72 of the fuel-cell cooling system 70.

Examples of the earthquake determination means include a falling sensor, the falling determination portion that determines whether the hot-water storage tank 76 and/or the stack 2 are/is falling, a vibration sensor that detects vibrations, and an earthquake-wave sensor that detects earthquake waves. When lightning-strike determination means determines that lightening has struck the nearby ground, the control device 3 selects one of the controls A to D. Depending on severity of lightening strike, the control device 3 selects the control C or the control D.

In each of the above-described embodiments, the stack 2 includes the polymer ion-conducting membrane (proton-conducting membrane). However, the ion-conducting membrane 20 is not limited to the polymer ion-conducting membrane. The ion-conducting membrane 20 may be an oxide ion-conducting membrane. In addition, the invention is not limited to the embodiments that are described above, and shown by the drawings. Modifications may be appropriately made within the scope of the invention. The specific structure and function of one of the above-described embodiments may be employed in the other embodiments.

In each of the above-described embodiments, the control device selects a specific stop control mode among the plurality of stop control modes, based on the cause of a malfunction relating to the fuel cell system. Thus, it is possible to execute a stop control mode appropriate for the cause of the malfunction.

The following technical ideas are derived from the above description.

[Additional description 1] A fuel cell system includes a reformer that generates reformed gas using reforming fuel; a fuel cell that generates electric power using the reformed gas generated by the reformer; and a control device that controls stop of operation of the reformer and stop of operation of the fuel cell. The fuel cell system includes anode excessive negative-pressure prevention means for preventing pressure in the anode of the stack of the fuel cell from becoming excessively negative by supplying gas that remains in the reformer to the anode of the stack of the fuel cell, when pressure inside the reformer becomes high due to the stop of the operation of the fuel cell system. When the pressure inside the reformer becomes high due to the stop of the operation of the fuel cell system, the excess gas that remains in the reformer is supplied to the anode of the fuel cell. This prevents the pressure in the anode from becoming excessively negative. Further, it is possible to prevent the pressure in the reformer from becoming excessively high, and to improve the performance of protecting the constituent components of the reformer.

[Additional description 2] A fuel cell system includes a reformer that generates reformed gas using reforming fuel; a fuel cell that generates electric power using the reformed gas generated by the reformer; and a control device that controls stop of operation of the reformer and stop of operation of the fuel cell. The fuel cell system includes reformer excessive high-pressure prevention means for preventing pressure inside the reformer from becoming excessively high by supplying gas that remains in a reforming portion of the reformer to a combustion portion of the reformer, which includes a combustion-exhaust-gas passage, when the pressure inside the reformer becomes high due to the stop of the operation of the fuel cell system. This prevents the pressure inside the reformer from becoming excessively high, and improves the performance of protecting the constituent components of the reformer.

[Additional description 3] A fuel cell system includes a reformer that generates reformed gas using reforming fuel; and a fuel cell that generates electric power, using the reformed gas generated by the reformer. The fuel cell system includes a control device that controls the fuel cell system. In this case, the fuel cell system is appropriately controlled.

[Additional description 4] The fuel cell system described in the additional description 3, includes an emergency stop operating device that is operated by an operator (for example, a user, or a person in charge of maintenance) to bring the operation of the fuel cell system to an emergency stop. The emergency stop operating device is provided independently of, and separately from an operating device that stops the power generation of the fuel cell system. The operation of the system is quickly stopped by the emergency stop operating device.

[Additional description 5] The fuel cell system described in the additional description 3 or 4, includes a restriction stop operating device. When the restriction stop operating device is operated by an operator (for example, a user, or a person in charge of maintenance) to start the fuel cell system for the first time after the operation of the fuel cell system is brought to an emergency stop because of a malfunction, restriction of part of, or all of a function of the fuel cell system is stopped. When the restriction stop operating device is not operated, part of, or all of the function (power-generation function) of the fuel cell system is restricted. With this configuration, it is possible to restart the fuel cell system without any problem.

[Additional description 6] The fuel cell system described in any one of the additional descriptions 3 to 5, includes warning means for informing that a malfunction occurs in the fuel cell system (for example, the power-generation operation is stopped, or interrupted). In the fuel cell system, the control device restricts part of, or all of the function (power-generation function) of the fuel cell, when the warning means outputs a warning. In this case, for example, generation of anode gas is stopped, supply of the anode gas is stopped, generation of cathode gas is stopped, and/or supply of the cathode gas is stopped.

What is claimed is:

1. A fuel cell system comprising:
   a reformer that generates reformed gas using reforming fuel;
   a fuel cell that generates electric power using the reformed gas generated by the reformer; and
   a control device programmed to include a plurality of different stop control modes for stopping operation of the fuel cell system, and further programmed to select a specific stop control mode among the plurality of stop control modes, according to a cause of a malfunction of the fuel cell system,
   wherein the plurality of stop control modes includes at least three stop control modes,
   wherein each stop control mode in the plurality of stop control modes is associated with a different degree of urgency of stopping the fuel cell system,
   wherein the control device is further programmed to select among the at least three stop control modes depending on severity or type of the cause of the malfunction of the fuel cell system, and
   wherein the at least three stop control modes comprise:
     a stop control mode of prohibiting supply of the reformed gas generated by the reformer to the fuel cell by interrupting communication between the reformer and an anode of the fuel cell,
     a stop control mode of prohibiting the supply of the reformed gas generated by the reformer to the fuel cell by interrupting the communication between the reformer and the anode of the fuel cell, and prohibiting supply of the reforming fuel to the reformer, and
     a stop control mode of prohibiting the supply of the reformed gas generated by the reformer to the fuel cell by interrupting the communication between the reformer and the anode of the fuel cell, prohibiting the supply of the reforming fuel to the reformer, and prohibiting supply of combustion air to the reformer.

2. The fuel cell system according to claim 1, further comprising:
   a supply valve, provided between the reformer and the fuel cell, which is opened and closed to permit and prohibit supply of the reformed gas generated by the reformer to the fuel cell, wherein:
   when urgency of stopping the fuel cell system is relatively low, the control device is further programmed to execute a stop control mode where the supply valve is opened to permit the supply of the reformed gas generated by the reformer to the fuel cell so that the reformed gas is contained in the fuel cell; and
   when the urgency of stopping the fuel cell system is relatively high, the control device is also programmed to execute a stop control mode where the supply valve is closed to prohibit the supply of the reformed gas generated by the reformer to the fuel cell.

3. The fuel cell system according to claim 1, wherein:
the reformer includes a reforming portion that generates the reformed gas using the reforming fuel, and a combustion portion to which combustion air and combustion fuel are supplied, and which heats the reforming portion by combustion of the combustion fuel;
when urgency of stopping the fuel cell system is relatively low, the control device is further programmed to execute a stop control mode where supply of the combustion fuel to the combustion portion is prohibited, and the combustion air is supplied to the combustion portion to cool the reformer; and
when the urgency of stopping the fuel cell system is relatively high, the control device is further programmed to execute a stop control mode where the supply of the combustion fuel to the combustion portion is stopped, and supply of the combustion air to the combustion portion is prohibited.

4. The fuel cell system according to claim 1, further comprising:
a condenser that condenses moisture contained in the reformed gas supplied from the reformer to the fuel cell;
a condensing-system delivery source that moves a cooling medium to cool the condenser;
a cooling medium passage through which the cooling medium is circulated to cool the fuel cell;
a hot-water storage passage connected to a hot-water storage tank;
a heat exchange portion in which heat is exchanged between the cooling medium in the cooling medium passage and water in the hot-water storage passage; and
a hot-water storage system delivery source that moves the water in the hot-water storage passage, wherein:
when urgency of stopping the fuel cell system is relatively low, the control device is further programmed to execute a stop control mode where cooling operation of driving the condensing-system delivery source and the hot-water storage system delivery source is performed; and
when the urgency of stopping the fuel cell system is relatively high, the control device is further programmed to execute a stop control mode where the condensing-system delivery source and the hot-water storage system delivery source are prohibited from being driven.

5. The fuel cell system according to claim 1, wherein the reformer includes a reforming portion that generates the reformed gas using the reforming fuel, and a combustion portion to which combustion air and combustion fuel are supplied, and which heats the reforming portion by combustion of the combustion fuel, the fuel cell system further comprising:
a bypass valve, provided between the reforming portion and the combustion portion, which is opened and closed to permit and prohibit supply of the reformed gas generated by the reforming portion to the combustion portion, wherein:
when urgency of stopping the fuel cell system is relatively low, the control device is further programmed to execute a stop control mode where the bypass valve is opened to permit the supply of the reformed gas generated by the reforming portion to the combustion portion so that the reformed gas is contained in the combustion portion; and
when the urgency of stopping the fuel cell system is relatively high, the control device is also programmed to execute a stop control mode where the bypass valve is closed to prohibit the supply of the reformed gas generated by the reforming portion to the combustion portion.

6. The fuel cell system according to claim 1, further comprising:
a purge valve, provided between a source of the reforming fuel and the fuel cell, which is opened and closed to permit and prohibit supply of the reforming fuel to the fuel cell, wherein:
when urgency of stopping the fuel cell system is relatively low, the control device is further programmed to execute a stop control mode where the purge valve is opened to permit the supply of the reforming fuel to the fuel cell so that the reforming fuel is contained in the fuel cell; and
when the urgency of stopping the fuel cell system is relatively high, the control device is also programmed to execute a stop control mode where the purge valve is closed to prohibit the supply of the reforming fuel to the fuel cell.

7. The fuel cell system according to claim 1, further comprising:
a memory that stores an operating state of the fuel cell system; and
a restart control device programmed to control restart of the fuel cell system based on the operating state of the fuel cell system stored in the memory, when the fuel cell system is restarted.

8. The fuel cell system according to claim 7, wherein:
the restart control device includes a restart prohibition device that executes a diagnostic mode when a restart switch is operated to restart the fuel cell system after the operation of the fuel cell system is brought to an emergency stop;
wherein the restart prohibition device has suitable programming such that, when it is determined that a constituent component of the fuel cell system is in a normal state based on a result of a determination made in the diagnostic mode, the restart prohibition device permits restart of the fuel cell system; and
wherein the restart prohibition device has further programming such that, when it is determined that the constituent component is not in the normal state based on the result of the determination made in the diagnostic mode, the restart prohibition device prohibits the restart of the fuel cell system.

9. The fuel cell system according to claim 1, further comprising:
an anode excessive negative-pressure prevention device that prevents pressure in the anode of the fuel cell from becoming excessively negative by supplying gas that remains in the reformer to the anode of the fuel cell, when pressure inside the reformer becomes high due to stop of the operation of the fuel cell system.

10. The fuel cell system according to claim 1, further comprising:
a reformer excessive high-pressure prevention device that prevents pressure inside the reformer from becoming excessively high by supplying gas that remains in the reformer to a combustion portion of the reformer, when the pressure inside the reformer becomes high due to stop of the operation of the fuel cell system.

11. A fuel cell system comprising:
a reformer that generates reformed gas using reforming fuel;
a fuel cell that generates electric power using the reformed gas generated by the reformer; and
a control device programmed to include a plurality of different stop control modes for stopping operation of the fuel cell system, and further programmed to select a specific stop control mode among the plurality of stop control modes, according to a cause of a malfunction of the fuel cell system, wherein the plurality of stop control modes includes at least three stop control modes, wherein each stop control mode in the plurality of stop control modes is associated with a different degree of urgency of stopping the fuel cell system, wherein the control device is further programmed to select among the at least three stop control modes depending on severity or type of the cause of the malfunction of the fuel cell system, wherein the at least three stop control modes comprise:
- a stop control mode of prohibiting supply of the reformed gas generated by the reformer to the fuel cell by interrupting communication between the reformer and an anode of the fuel cell,
- a stop control mode of prohibiting the supply of the reformed gas generated by the reformer to the fuel cell by interrupting the communication between the reformer and the anode of the fuel cell, and prohibiting supply of the reforming fuel to the reformer, and
- a stop control mode of prohibiting the supply of the reformed gas generated by the reformer to the fuel cell by interrupting the communication between the reformer and the anode of the fuel cell, prohibiting the supply of the reforming fuel to the reformer, and prohibiting supply of combustion air to the reformer, wherein the cause of the malfunction is any of an output abnormality from a stack, a temperature abnormality, a supply/discharge abnormality of water, a gas leak abnormality, a malfunction in an electric system, a pressure abnormality, a temperature abnormality inside a fuel cell system box, a control abnormality, and an electric outage abnormality.

* * * * *